US012340070B2

(12) United States Patent
Weber et al.

(10) Patent No.: US 12,340,070 B2
(45) Date of Patent: Jun. 24, 2025

(54) PROVIDING SELECTABLE QUICK ACTIONS ON HANDWRITTEN DATA IN A HANDWRITTEN DOCUMENT

(71) Applicant: Wacom Co., Ltd., Saitama (JP)

(72) Inventors: Markus Weber, Düsseldorf (DE); Yoana Simeonova, Sofia (BG); Goerkem Sinirlioglu, Düsseldorf (DE); Nikolay Vasilev, Sofia (BG)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/356,015

(22) Filed: Jul. 20, 2023

(65) Prior Publication Data

US 2025/0028426 A1    Jan. 23, 2025

(51) Int. Cl.
*G06F 3/0482* (2013.01)
*G06F 3/04883* (2022.01)
*G06F 40/295* (2020.01)

(52) U.S. Cl.
CPC ........ *G06F 3/0482* (2013.01); *G06F 3/04883* (2013.01); *G06F 40/295* (2020.01)

(58) Field of Classification Search
CPC ... G06F 3/0482; G06F 3/04883; G06F 40/295
See application file for complete search history.

(56) References Cited

U.S. PATENT DOCUMENTS

| | | | | |
|---|---|---|---|---|
| 5,787,197 A * | 7/1998 | Beigi | ................... | G06V 30/268 |
| | | | | 382/229 |
| 6,738,514 B1 * | 5/2004 | Shin | ..................... | G06V 30/373 |
| | | | | 382/187 |
| 2004/0080532 A1 * | 4/2004 | Cragun | ................... | G06F 16/34 |
| | | | | 707/E17.093 |
| 2013/0332859 A1 * | 12/2013 | Patton | ..................... | G06T 13/40 |
| | | | | 715/753 |
| 2016/0147436 A1 * | 5/2016 | Tsutsui | ................ | G06F 3/04883 |
| | | | | 715/268 |
| 2017/0068436 A1 * | 3/2017 | Auer | .................... | G06F 3/04883 |
| 2017/0068445 A1 * | 3/2017 | Lee | ........................ | G06F 40/171 |
| 2017/0068854 A1 * | 3/2017 | Markiewicz | ........... | G06V 30/36 |
| 2017/0098159 A1 * | 4/2017 | Sharifi | ................... | G06F 3/0481 |
| 2018/0181221 A1 * | 6/2018 | Nakajima | ........... | G06F 3/04883 |
| 2021/0117509 A1 * | 4/2021 | Aditya | .................... | G06F 40/30 |

* cited by examiner

*Primary Examiner* — Asher D Kells
(74) *Attorney, Agent, or Firm* — Seed IP Law Group LLP

(57) ABSTRACT

A method for providing selectable quick actions on handwritten data in a handwritten document is disclosed. The method includes fetching the handwritten data corresponding to strokes made by a user in the handwritten document and recognizing text associated with the received handwritten data by employing a handwriting recognition technique. The method also includes identifying keywords in the recognized text and classifying each identified keyword into an entity type by employing a named entity recognition, a named entity linking, and/or a knowledge graph. In some embodiments, the method includes determining actionable items associated with the classified entity type corresponding to each keyword and creating quick actions, selectable by the user, for each keyword based on the determined actionable items via the knowledge graph. The method includes rendering the created quick actions associated with each keyword on the handwritten document based on a profile associated with the user.

18 Claims, 18 Drawing Sheets

PROVIDING SELECTABLE QUICK ACTIONS ON HANDWRITTEN DATA IN A HANDWRITTEN DOCUMENT

BACKGROUND

Technical Field

The present disclosure relates to the field of handwritten data, and in particular, relates to a system and method for providing selectable quick actions on handwritten data in a handwritten document.

Description of the Related Art

With the fast-growing adaptation of digital writing pads, such as tablets, electronic boards, pen tablets, and the like, people are increasingly taking notes in the form of handwritten data in handwritten documents provided by the digital writing pads. The handwritten documents provide various advantages over typed documents, such as a personal touch of a user's handwriting, authenticity that is especially important in legal or historical documents, flexibility to customize and personalize based on personal preferences of font, color or style, and time-saving by allowing quick note taking.

However, the electronic devices such as the digital writing pads, computers, mobile phones, tablets, Personal Digital Assistant (PDA), or the like, merely treat the handwritten documents as images of scribbling made by a user, which the user may later access for viewing at the user's convenience. Thus, the advantage of electronically handwritten documents over the conventional pen-paper method of taking notes is limited to their portability. Further, in order to act on one or more terms (e.g., words) in the handwritten data, the user has to perform a series of actions, which is time-consuming and may be inconvenient to the user. For example, if the user wants to know more about a company's name that appeared in the handwritten document, the user has to minimize the handwritten document, then open a search engine, then type in the company's name based on his/her interpretation, then search through several pages of the search result to get the information that he/she is looking for. In another non-limiting example, if a date of an upcoming event appeared in the handwritten document that the user wants to attend, then the user has to minimize the handwritten document, go to the calendar, search for the date, and type in the event's name to mark the calendar for the event.

Accordingly, while the conventional electronic handwriting technologies may be time-efficient in writing data by hand as compared with typing on paper, they are time-consuming when it comes to gathering information or taking some action about any term (word) written on the handwritten document. Further, the conventional electronic handwriting technologies fail to provide advantages associated with the digitization of handwriting, and their advantages are currently limited to their portability over the pen-paper method and their personal touch over typed documents.

Therefore, there is a need for a system and method to make the handwritten document more interactive to overcome the above-mentioned drawbacks of the known technologies.

BRIEF SUMMARY

The following embodiments are directed to a system and method for providing selectable quick actions on handwritten data in a handwritten document.

An embodiment of the present disclosure discloses a system for providing selectable quick actions on handwritten data in a handwritten document. The system includes a receiver module configured to fetch the handwritten data corresponding to strokes made by a user in the handwritten document on a screen of an electronic device, such as a touch-enabled device, a stylus-enabled device, and a pen-enabled device. The electronic device may be a mobile phone, a tablet, a personal computer, a digital signage, a smartboard, or a television. In some embodiments of the present disclosure, the handwritten data is received in the form of one or more tuples having data on x-axis, data on y-axis, pressure, speed of writing, orientation, or any combination thereof.

The system also includes a recognition module to recognize text associated with the received handwritten data by employing a handwriting recognition technique. The handwriting recognition techniques analyze each of the received one or more tuples to identify the closest recognized term (e.g., word) that each of the received one or more tuples potentially represents. In some embodiments of the present disclosure, the recognition module identifies one or more keywords in the recognized text by removing unnecessary data from the recognized text. The unnecessary data may include stop words, punctuation marks, spaces, or a combination thereof.

The system also includes an analyzer module to classify each of the identified one or more keywords into an entity type, out of one or more entity types, by employing a named entity recognition, a named entity linking, a knowledge graph, or a combination thereof. The one or more entity types include a person, a company, a legal entity, a location, an event, an abstract concept, a service, a product, or a combination thereof. The analyzer module also determines a set of actionable items associated with the classified entity type. The set of actionable items include show relation information, show social media link, show description, show alternate names, show mail, show planner, show weather checker, show accommodation booking options, show options to add an event to a calendar, show summarized relevant information, show digital wallet options, show read more, show direct call option, show RSVP option, show enable/disable options, show purchase option, or a combination thereof.

In an embodiment of the present disclosure, the analyzer module creates one or more quick actions, selectable by the user, for each keyword based on the determined set of actionable items via the knowledge graph. The one or more quick actions include providing, for each keyword, relation information of persons, relation information of the company, one-touch social media links, description information, alternate names, mail shortcut, planner, weather checker, accommodation booking options, an option to add the event to a calendar, summarized relevant information along with one or more link, digital wallet shortcut, read more link, calling options, message sending option for RSVP, shortcuts for enable/disable the service, a link for purchasing a product, or a combination thereof.

Additionally, the system includes a rendering module to render the created one or more quick actions associated with each keyword or with the identified entity type on the handwritten document based on a profile associated with the user. In some embodiments of the present disclosure, the rendering module renders the one or more quick actions in the form of a list of all the quick actions for each keyword or for the identified entity type on the handwritten document. Emphases may be added to the one or more keywords to render the corresponding quick actions, or the one or more quick actions may be presented in a dynamic window overlaying the one or more keywords in the digital document. In an embodiment of the present disclosure, the dynamic window for a specific keyword is generated when a predicted user action score for a specific quick action is more than a threshold value. Additionally, the dynamic window may pop up based on an action including clicking on the keyword, hovering on the keyword for more than a threshold period of time, or a combination thereof.

In an embodiment of the present disclosure, the rendering module employs predictive learning based on the profile associated with the user to identify the one or more keywords or identified entity types for which the one or more quick actions must be rendered. The profile associated with the user has historical data of the user indicative of the keywords of interest to the user, the keywords that the user should know about, the keywords that the user knows about, the keywords that are appropriate for the user, the keywords that are inappropriate for the user, or a combination thereof.

In another embodiment of the present disclosure, the rendering module employs predictive learning based on the profile associated with the user to identify the determined one or more quick actions of interest to the user. The profile associated with the user includes user interests, user's profession, user's schedule, user's list of events, or a combination thereof.

An embodiment of the present disclosure discloses a method for providing selectable quick actions on handwritten data in a handwritten document. The method includes the steps of fetching the handwritten data corresponding to strokes made by a user in the handwritten document on a screen of an electronic device and recognizing text associated with the received handwritten data by employing a handwriting recognition technique. In some embodiment of the present disclosure, the method includes the steps of identifying one or more keywords in the recognized text and classifying each of the identified one or more keywords into an entity type from one or more entity types. The classification of the one or more keywords into the entity types is performed by employing a named entity recognition, a named entity linking, a knowledge graph, or a combination thereof.

In some embodiment of the present disclosure, the method includes the steps of determining a set of actionable items associated with the classified entity type and creating one or more quick actions for one or more keywords or the classified entity type based on the determined set of actionable items via the knowledge graph. Such one or more quick actions are selectable by the user. The method also includes steps of rendering the created one or more quick actions associated with one or more keywords or with the classified entity types on the handwritten document based on a profile associated with the user.

In an embodiment of present disclosure, the method includes the steps of rendering the one or more quick actions in the form of a list of all the quick actions for one or more keywords or the classified entity type on the handwritten document. The method may further include adding emphases to the one or more keywords to render the corresponding quick actions, presenting the one or more quick actions in the dynamic window overlaying the one or more keywords in the digital document, or a combination thereof. The dynamic window for a specific keyword is generated when a predicted user action score for a specific quick action is more than a threshold value. Such dynamic window may pop up based on an action such as clicking on the keyword, hovering on the keyword for more than a threshold period of time, or a combination thereof.

In an embodiment of the present disclosure, the method includes the steps of employing predictive learning based on the profile associated with the user to identify the one or more keywords for which the one or more quick actions must be rendered for the user. The profile associated with the user has historical data of the user indicative of the keywords of interest to the user, the keywords that the user should know about, the keywords that the user knows about, the keywords that are appropriate for the user, the keywords that are inappropriate for the user, or a combination thereof.

In an embodiment of the present disclosure, the method includes the steps of employing predictive learning based on the profile associated with the user to identify the determined one or more quick actions of interest to the user, wherein the profile associated with the user includes user interests, user's profession, user's schedule, user's list of events, or a combination thereof.

The features and advantages of the subject matter here will become more apparent in light of the following detailed description of selected embodiments, as illustrated in the accompanying FIGURES. As will be realized, the subject matter disclosed is capable of modifications in various respects, all without departing from the scope of the present disclosure. Accordingly, the drawings and the descriptions are to be regarded as illustrative in nature.

BRIEF DESCRIPTION OF THE SEVERAL VIEWS OF THE DRAWINGS

In the FIGURES, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

Figure 1:
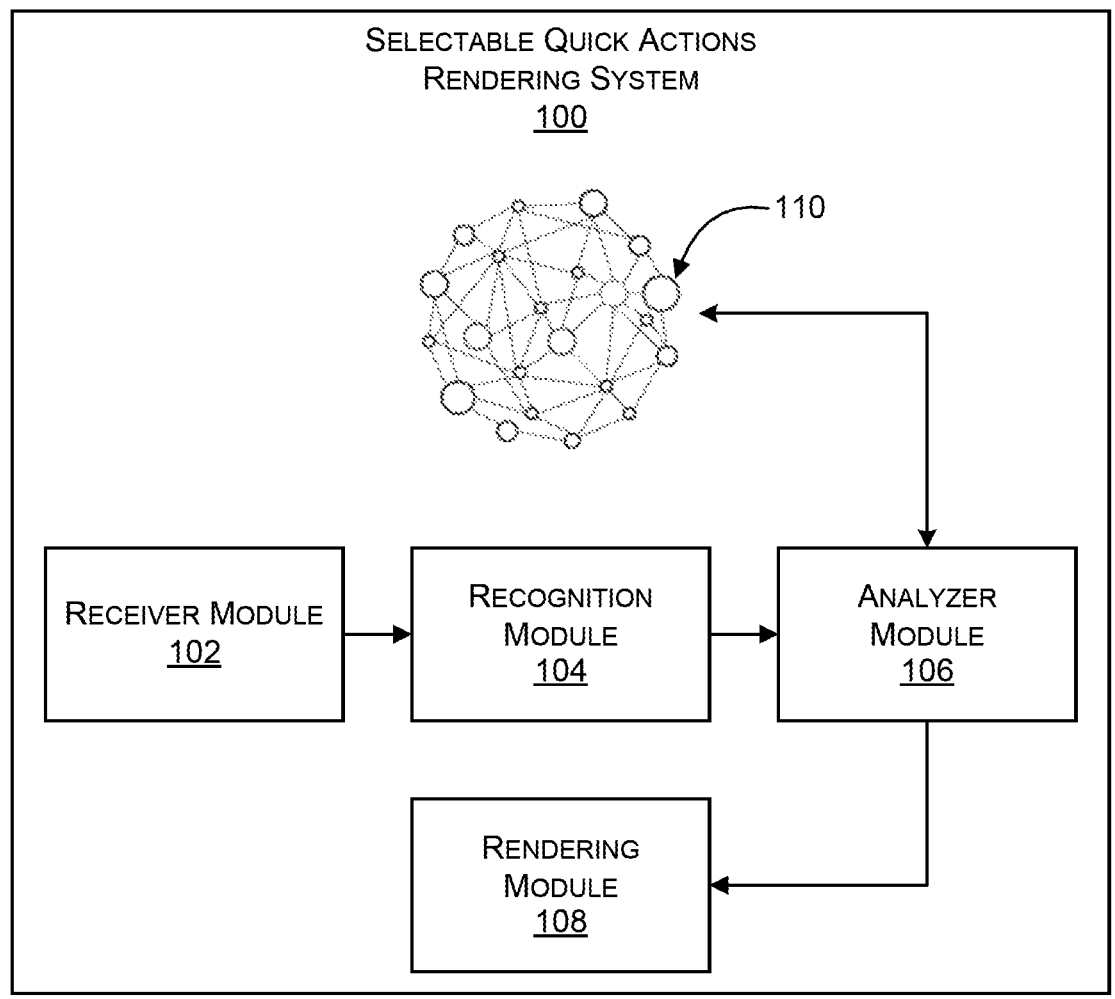
FIG. 1 illustrates a block diagram of a selectable quick actions rendering system for providing selectable quick actions on handwritten data in a handwritten document, in accordance with various embodiments of the present disclosure.

Other features of embodiments of the present disclosure will be apparent from the accompanying drawings and the detailed description that follows.

DETAILED DESCRIPTION

Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware, and/or by human operators.

Embodiments of the present disclosure may be provided as a computer program product, which may include a machine-readable storage medium tangibly embodying thereon instructions, which may be used to program the computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other types of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within the single computer) and storage systems containing or having network access to a computer program(s) coded in accordance with various methods described herein, and the method steps of the disclosure could be accomplished by modules, routines, subroutines, or subparts of a computer program product.

Terminology

Brief definitions of terms used throughout this application are given below.

The terms "connected" or "coupled", and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context dictates otherwise. Also, as used in the description herein, the meaning of "in" includes "in" and "on" unless the context dictates otherwise.

The phrases "in an embodiment." "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

Exemplary embodiments will now be described more fully hereinafter with reference to the accompanying drawings, in which exemplary embodiments are shown. This disclosure may, however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this disclosure. The functions of the various elements shown in the FIGURES may be provided through the use of dedicated hardware as well as hardware capable of executing associated software. Similarly, any switches shown in the FIGURES are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular named.

Embodiments of the present disclosure relate to a system and method for providing selectable quick actions on handwritten data in a handwritten document. The system fetches the handwritten data corresponding to strokes made by a user in the handwritten document on a screen of an electronic device. Further, the system recognizes text associated with the received handwritten data by employing a handwriting recognition technique and identifies one or more keywords in the recognized text. The system classifies each of the identified one or more keywords into an entity type from one or more entity types by employing a named entity recognition, a named entity linking, and/or a knowledge graph. The system further determines a set of actionable items associated with the classified entity type corresponding to each keyword, and creates one or more quick actions, selectable by the user, for one or more keywords or their identified entity types based on the determined set of actionable items via the knowledge graph. Further, the system renders the created one or more quick actions associated with the one or more keywords or their identified entity types on the handwritten document based on a profile associated with the user.

FIG. 1 illustrates a block diagram of a selectable quick actions rendering system 100 (hereinafter alternatively termed as a system 100) for providing selectable quick actions on handwritten data in a handwritten document, in accordance with various embodiments of the present disclosure. The handwritten document, for the purpose of the disclosure, corresponds to a digital document having handwritten data. Such handwritten data may correspond to one or more words on the handwritten document, a sentence on the handwritten document, or the entire handwritten document in general. Further, the handwritten data may include static handwritten data and dynamic handwritten data. The static handwritten data may correspond to the geometrical data associated with the user's handwritten data, such as an image. The dynamic handwritten data may correspond to a chronological sampling of movement of handwritten data, such as data on x-axis, data on y-axis, pressure, speed of writing, and orientation.

In an embodiment of the present disclosure, providing selectable quick actions may include providing one or more shortcuts to the user to present an option to take a quick action, to obtain more information, or to do both, with respect to the handwritten data on the handwritten document. The selectable quick actions may include, without any limitation, show relation information of persons, show relation information of the company, show one-touch social media links, show description information, show alternate names, show mail shortcut, show planner, show weather checker, show accommodation booking options, show an option to add the event to a calendar, show summarized relevant information along with one or more link, read more link, show calling options, show message sending option for RSVP, show shortcuts for enable/disable the service, show a link for purchasing a product, or a combination thereof.

In one embodiment of the present disclosure, as shown in FIG. 1, the system 100 for managing handwritten documents may be implemented on a server and may include a receiver module 102, a recognition module 104, an analyzer module 106, a rendering module 108, and a knowledge graph 110. The receiver module 102, the recognition module 104, the analyzer module 106, the rendering module 108, and the knowledge graph 110 may be communicatively coupled to a memory and a processing unit of the system 100. The server may be a centralized server or a decentralized server. In an embodiment, different modules of the system may use cloud resources, such as cloud memory and cloud processing. In an embodiment, the system 100 may be implemented on an end-user device.

The processing unit of the system 100 may control the operations of the receiver module 102, the recognition module 104, the analyzer module 106, the rendering module 108, and the knowledge graph 110. In an embodiment of the present disclosure, the processor and the memory may form a part of a chipset installed in the system 100. In another embodiment of the present disclosure, the memory may be implemented as a static memory or a dynamic memory. In an example, the memory may be internal to the system 100, such as an onsite-based storage. In another example, the memory may be external to the system 100, such as cloud-based storage. Further, the processing unit may be implemented as one or more microprocessors, microcomputers, digital signal processors, central processing units, state machines, logic circuitries, and/or any devices that manipulate signals based on operational instructions.

In an embodiment of the present disclosure, the receiver module 102 may fetch the handwritten data corresponding to strokes made by the user in the handwritten document on a screen of an electronic device. The electronic device may correspond to a touch-enabled device, a stylus enabled device, or a pen-enabled device to permit the user to input the handwritten data in preparing the handwritten document via touch, stylus, and pen, respectively. Accordingly, the electronic device may, without any limitation, include a mobile phone, a tablet, a personal computer, a digital signage, a smartboard, and a television. The handwritten data may be received in the form of one or more tuples such as (x, y, p, s, o), wherein the 'x' may be data on x-axis, 'y' may be data on y-axis, 'p' may be pressure, 's' may be speed of writing, and 'o' may be orientation.

In an embodiment of the present disclosure, the recognition module 104 may recognize text associated with the received handwritten data, such as words, phrases, and sentences. Further, the text may be recognized by employing a handwriting recognition technique (e.g., universal ink model). To recognize the text, the handwritten recognition technique may analyze each of the received one or more tuples to identify a closest recognized term that each of the received one or more tuples potentially represents. In an embodiment of the present disclosure, the recognition module 104 may identify one or more keywords in the recognized text. To identify one or more keywords, the recognition module 104 may remove unnecessary data such as unnecessary words, stop marks, punctuation marks, and spaces from the recognition text. The recognition module 104 may also remove connecting words and articles. For example, if the recognized text is 'Company A, based in the US, is developing a product A', then the recognition module 104 identifies 'Company A', 'US', and 'product A' as keywords by removing ', based in the' and ', is developing a' from the recognized text.

In an embodiment of the present disclosure, the analyzer module 106 may classify each of the identified one or more keywords into an entity type from one or more entity types. The one or more entity types may, without any limitation, include a person, a company, a legal entity, a location, an event, an abstract concept, a service, a product, or a combination thereof. In an embodiment of the present disclosure, the entity type may be classified by employing a named entity recognition, a named entity linking, the knowledge graph 110, or a combination thereof. In one example, the entity types that do not correspond to sensitive data such as the person, the company, the legal entity, the location, the event, the abstract concept, the service, and the product, may be classified by the named entity linking and the knowledge graph 110.

In an embodiment of the present disclosure, the analyzer module 106 may determine a set of actionable items associated with the classified entity type corresponding to each keyword. The actionable items, for the purpose of the disclosure, may correspond to shortcuts that should be provided for a keyword for utilizing the keyword, get more information for the keyword, or a combination thereof. The set of actionable items may, without any limitation, include show relation information, show social media, show description, show alternate names, show mail, show planner, show weather checker, show accommodation booking options, show option to add an event to a calendar, show summarized relevant information, show digital wallet options, show read more, show direct call options, show RSVP option, show enable/disable options, show purchase option, or a combination thereof.

In an embodiment of the present disclosure, the analyzer module 106 may create one or more quick actions for each keyword based on the determined set of actionable items via the knowledge graph 110. For example, if the keyword is associated with a conference on July $22^{nd}$ then the actionable item may be 'show option to add an event to a calendar', then an option to add the conference to the calendar for July $22^{nd}$ may be created. The actionable item may include information that might be essential to assist the user to take a quick action. In the present example, the actionable item "add an event to a calendar" may include the event name and the date information required to create a calendar entry.

In an embodiment of the present disclosure, the rendering module 108 renders the created one or more quick actions associated with each keyword on the handwritten document based on a profile associated with the users. In an embodiment of the present disclosure, the rendering module 108 may employ predictive learning based on the profile associated with the user to identify the one or more keywords for which the one or more quick actions must be rendered. In such a scenario, the profile associated with the user may have historical data of the user indicative of the keywords of interest to the user, the keywords that the user should know about, the keywords that the user knows about, the keywords that are appropriate for the user, the keywords that are inappropriate for the user, or a combination thereof.

In another embodiment of the present disclosure, the rendering module 108 may employ the predictive learning based on the profile associated with the user to identify the determined one or more quick actions of interest to the user. In such a scenario, the profile associated with the user may, without any limitation, include user interests, user's profession, user's schedule, user's list of events, or a combination thereof.

In an embodiment of the present disclosure, the rendering module 108 renders the one or more quick actions in the form of a list of all the quick actions for each keyword on the handwritten document, adding emphases to the one or more keywords for rendering the corresponding quick actions, and/or presenting the one or more quick actions in a dynamic window overlaying the one or more keywords in the handwritten document. The dynamic window for a specific keyword may be generated when a predicted user action score for a specific quick action is more than a threshold value. Further, such dynamic window may pop up based on an action such as, without any limitation, clicking on the keyword and hovering on the keyword for more than a threshold period of time.

Figures 2A, 2B:
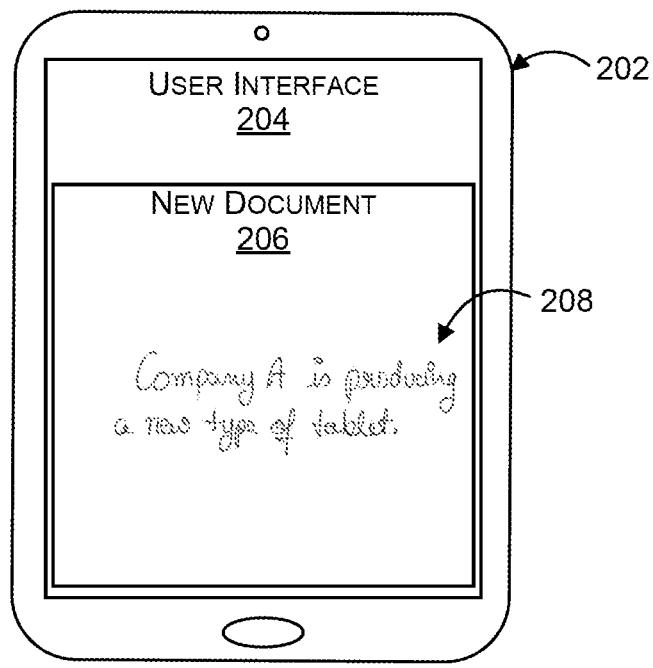
FIG. 2A illustrates an exemplary handwritten data received from an electronic device, in accordance with an embodiment of the present disclosure.
FIG. 2B illustrates an exemplary recognized text recognized by a recognition module, in accordance with an embodiment of the present disclosure.
Figure 2C:
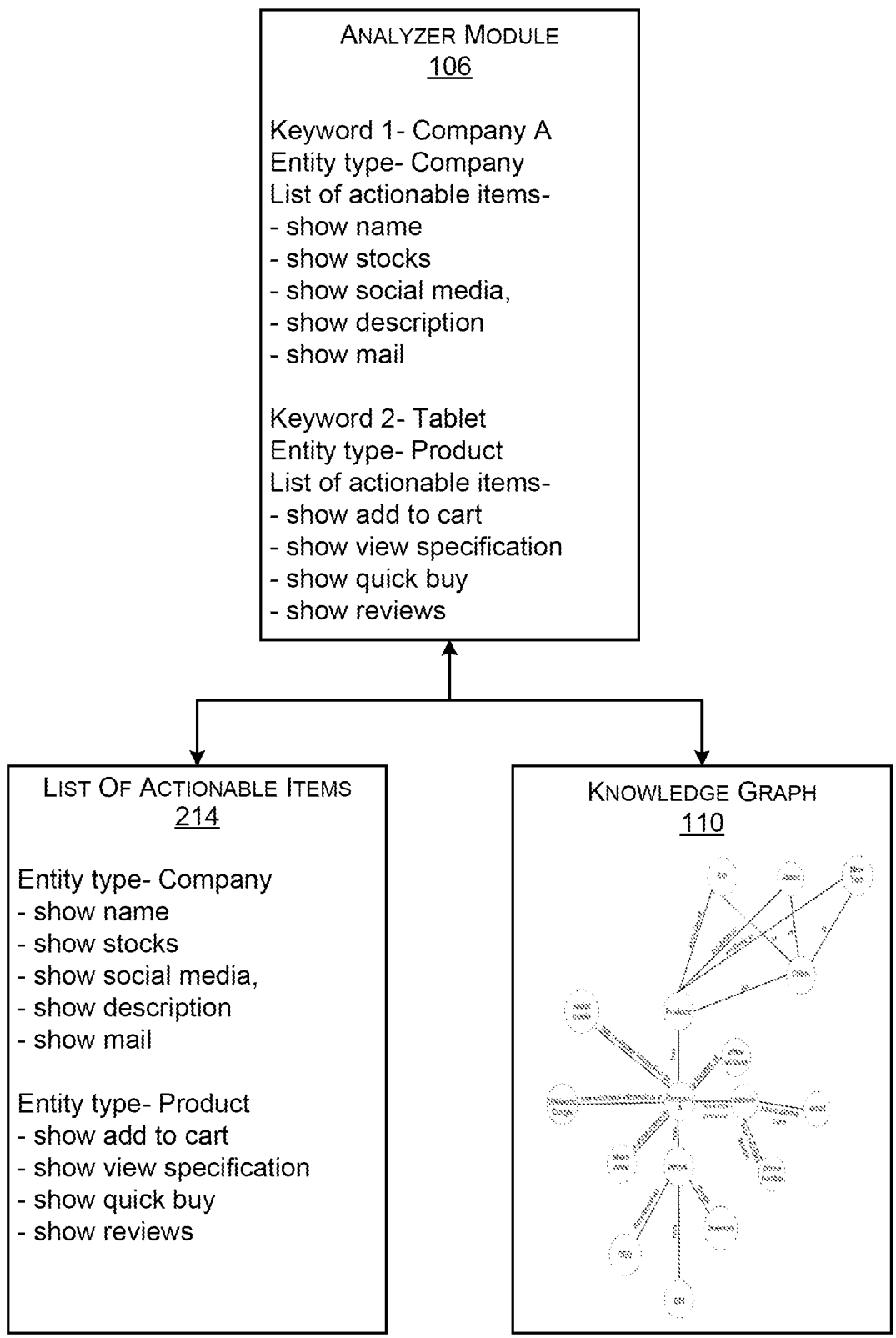
FIG. 2C illustrates an exemplary analyzed data analyzed by an analyzer module, in accordance with an embodiment of the present disclosure.
Figure 2D:
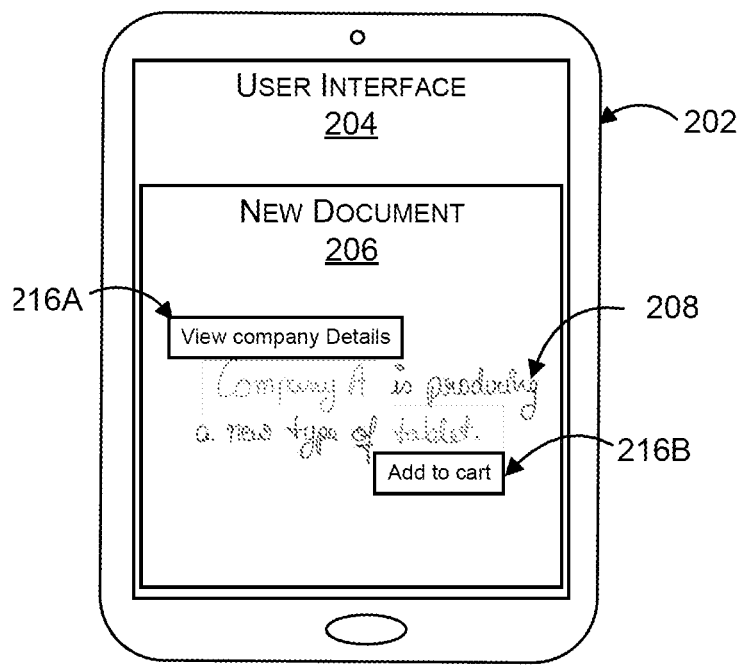
FIG. 2D illustrates exemplary quick actions rendered on the screen of the electronic device, in accordance with an embodiment of the present disclosure.
Figure 2E:
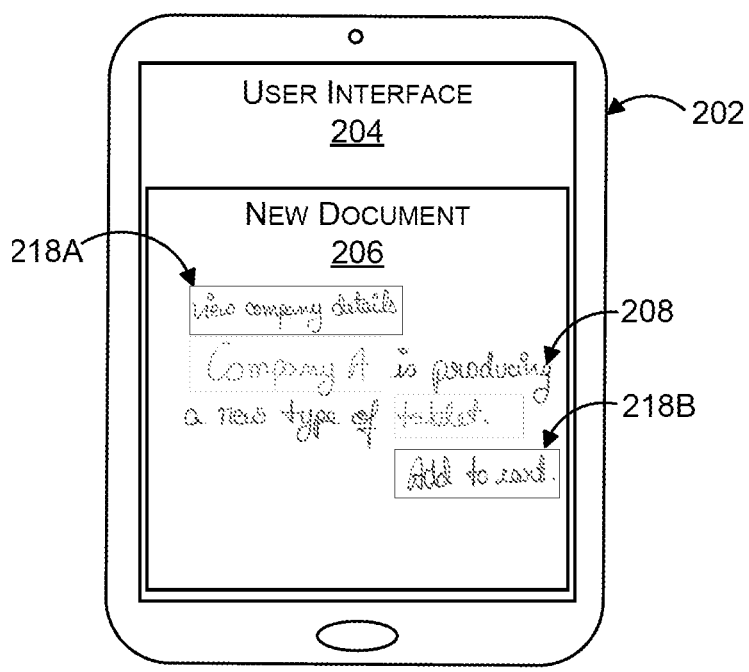
FIG. 2E illustrates exemplary quick actions rendered on the screen of the electronic device, in accordance with an embodiment of the present disclosure.
Figure 2F:
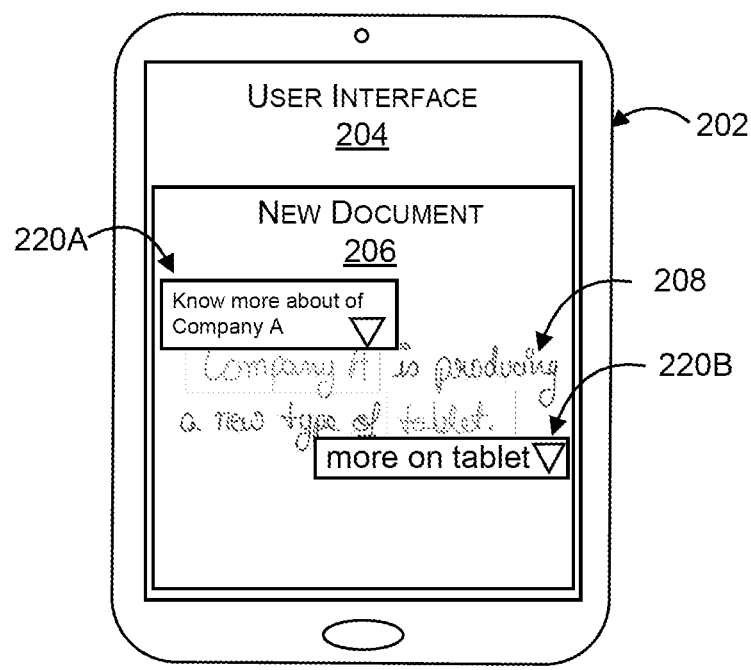
FIG. 2F illustrates exemplary quick actions rendered on the screen of the electronic device, in accordance with an embodiment of the present disclosure.
Figure 2G:
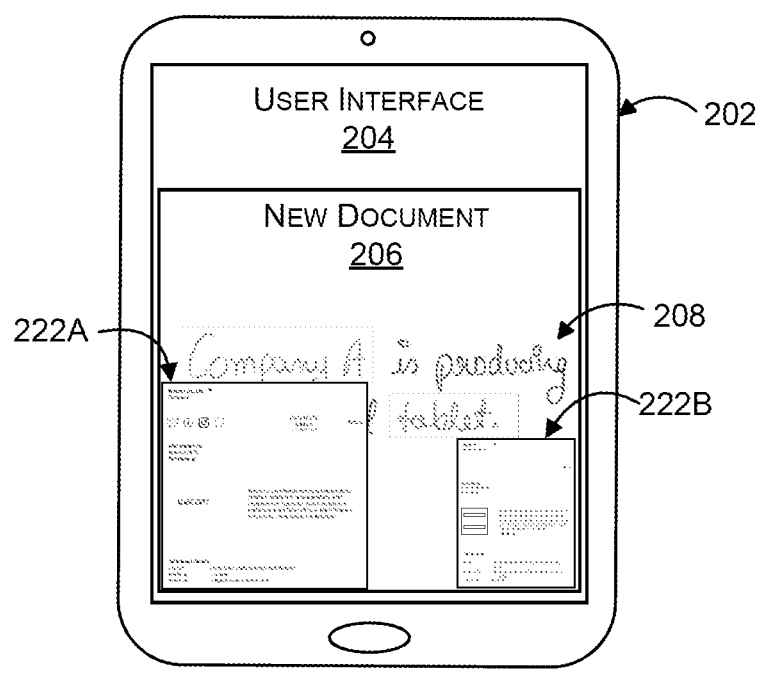
FIG. 2G illustrates exemplary quick actions rendered on the screen of the electronic device, in accordance with an embodiment of the present disclosure.

FIG. 2A illustrates an exemplary written data received from an electronic device, in accordance with an embodiment of the present disclosure. FIG. 2B illustrates an exemplary recognized text which is recognized by a recognition module 104, in accordance with an embodiment of the present disclosure. FIG. 2C illustrates an exemplary analyzed data which is analyzed by an analyzer module 106, in accordance with an embodiment of the present disclosure. FIG. 2D illustrates exemplary quick actions rendered on the screen of the electronic device 202, in accordance with an embodiment of the present disclosure. FIG. 2E illustrates exemplary quick actions rendered on the screen of the electronic device 202, in accordance with an embodiment of the present disclosure. FIG. 2F illustrates exemplary quick actions rendered on the screen of the electronic device 202, in accordance with an embodiment of the present disclosure. FIG. 2G illustrates exemplary quick actions rendered on the screen of the electronic device 202, in accordance with an embodiment of the present disclosure. For the sake of brevity of explanation, FIGS. 2A-2G will be explained together.

In an illustrated embodiment of the present disclosure, as shown in FIG. 2A, the electronic device 202 may provide a user interface 204 to facilitate the user to generate a handwritten document 206 such as a new document. To generate the new document, the user may add handwritten text 208 such as 'Company A is producing a new type of tablet' in the new document by way of writing on the screen of the electronic device 202 via touch, stylus, or pen.

In an illustrated embodiment of the present disclosure, as shown in FIG. 2B, the recognition module 104 may recognize the handwritten text 208, mentioned above, as a recognized text 210, i.e., 'Company A is producing a new type of tablet'. Further, the recognition module 104 may identify one or more keywords 212 from the recognized text 210, i.e., "Company A" and "tablet".

In an embodiment of the present disclosure, as shown in FIG. 2C, the analyzer module 106 may analyze the keywords 'company A' and 'tablet' to determine the list of actionable items 214, such as 'show name', 'show stocks', 'show social media', 'show description', and 'show mail' for the keyword 'company A' of the entity type 'company'; and 'show add to cart', 'show view specification', 'show quick buy', and 'show reviews' for the keyword 'tablet' of the entity type 'product'. The one or more actionable items to be associated with each of the entity type may be pre-associated. In an embodiment, one or more actionable items can be determined based on closest match of a new entity type with an existing entity type.

In an embodiment of the present disclosure, the rendering module 108 may render the created one or more quick actions associated with each keyword on the handwritten document 206, as shown in FIGS. 2D-2G. In an embodiment of the present disclosure, the one or more quick actions may be rendered as selectable options such as 'view company details' for 'company A' and 'add to cart' for 'tablet', as shown by 216A and 216B in FIG. 2D. In another embodiment of the present disclosure, the one or more quick actions may be rendered as selectable options, with dynamically generated font style matching the user's handwriting style used in the handwritten document 206 as shown in FIG. 2E. For example, actionable items 'view company details' for 'company A' and 'add to cart' for 'tablet', as shown by 218A and 218B in FIG. 2E, are presented in a font style matching the user's handwriting style. The font used to present the actionable item may be either generated dynamically based on the user's handwriting style or based on a closest matching standard font which can be selected. The user may be prompted to click on such selectable options to perform one or more actions, such as view company details or add the tablet in the cart to purchase, quickly without having to perform a series of steps.

In yet another embodiment of the present disclosure, the one or more quick actions may be rendered as drop-down menus such as 'know more about company A' for 'company A' and 'more on tablet' for 'tablet', as shown by 220A and 220B in FIG. 2F. The user may be prompted to click on the drop-down menus to see one or more actions, such as view company details, view stock price of the company, view specification of the tablet, or add the tablet in the cart, quickly without having to perform a series of steps.

In yet another embodiment of the present disclosure, the one or more quick actions may be rendered as dynamic windows 222A and 222B overlaying the keywords 'company A' and 'tablet', respectively, as shown in FIG. 2G. Such dynamic windows 222A and 222B may display one or more documents having detailed information about the keywords. Alternatively, or additionally, such dynamic windows 222A and 222B may also have one or more hyperlinks for viewing more information or performing one or more actions such as add to cart, as described above.

Figure 3:
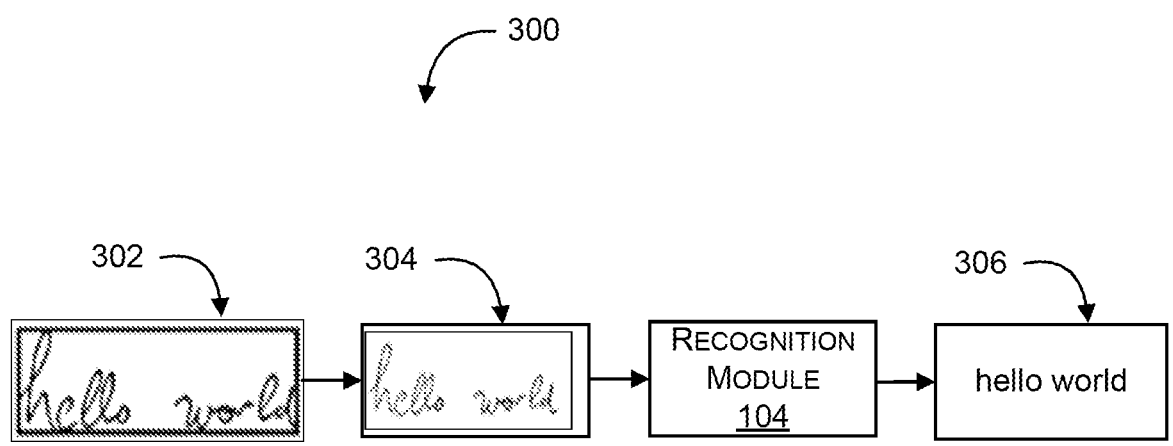
FIG. 3 illustrates an example of recognition of potential terms (words), in accordance with an embodiment of the present disclosure.

FIG. 3 illustrates an example 300 of recognition of potential terms, in accordance with an embodiment of the present disclosure. In the illustrated embodiment, the recognition module 104 may receive a handwritten document 302 having a handwritten text as an object 304. As shown, the handwritten text indicates 'hello world'. The recognition module 104 may process the handwritten document 302 to extract the object 304 from the handwritten document 302. Further, the recognition module 104 may use a suitable ink-to-text model to recognize the phrase 306, i.e., 'hello world'.

Figure 4:
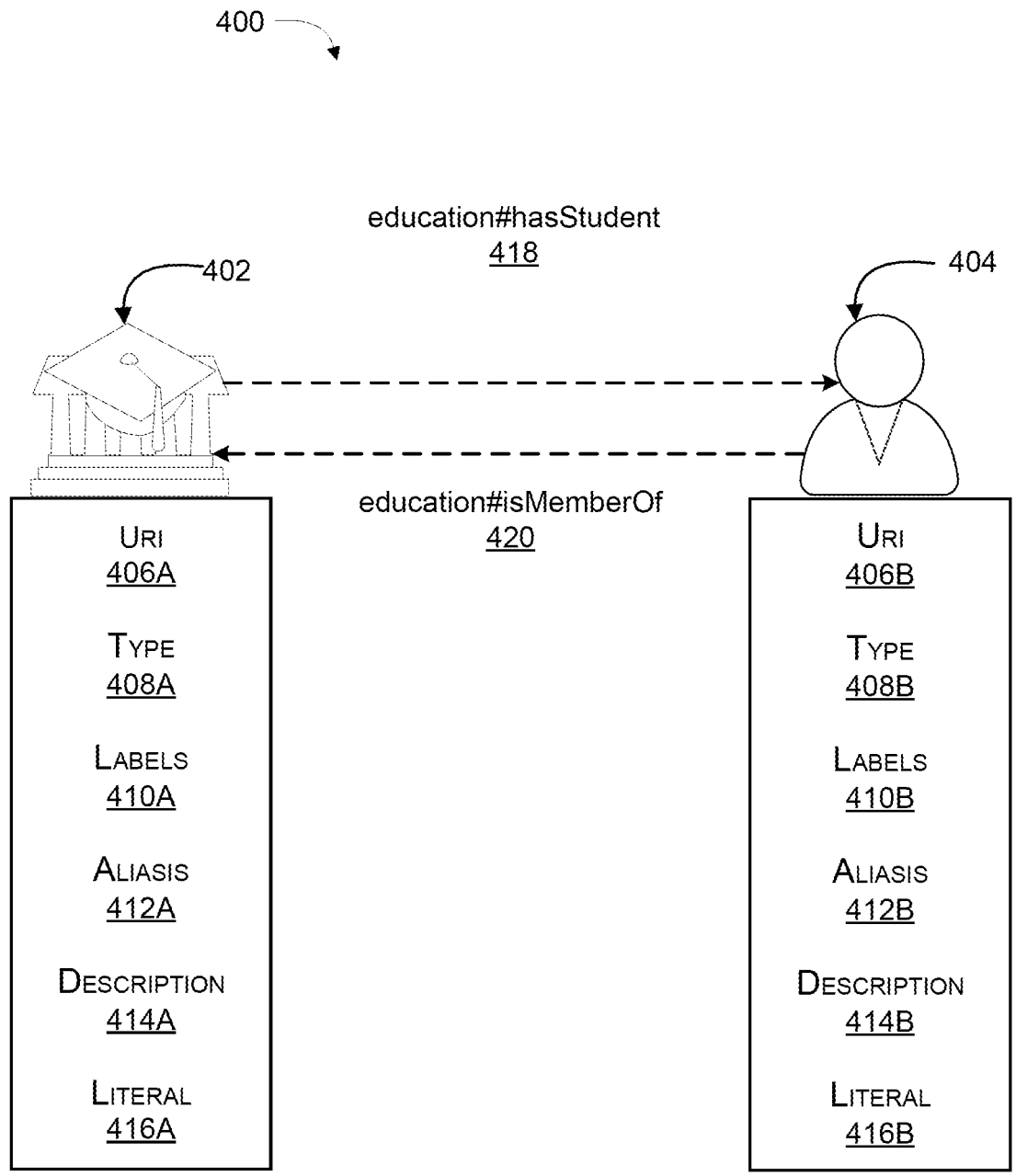
FIG. 4 illustrates an example of a multi-level relation between two terms, in accordance with an embodiment of the present disclosure.

FIG. 4 illustrates an example 400 of a multi-level relation between two terms (two words), in accordance with an embodiment of the present disclosure. In an embodiment of the present disclosure, the analyzer module 106 may determine a multi-level relation between two terms in the knowledge graph 110 to classify each of the identified one or more keywords 212 into the entity type. Assume two terms 'Playdium' and 'Harry' are associated with a school icon 402 and a personal profile 404, respectively. The school icon 402 has a corresponding Unique identifier (URI) 406A such as 2y5sch001, a type 408A such as education#school, a label 410A such as Playdium school of witchcraft and wizadry@en_US, an aliases 412A such as Playdium@en_US, a description 414A such as Playdium is a fictional Scottish boarding school of magic@en_US, and literal 416A such as 10$^{th}$ century. Further, the personal profile 404 has a corresponding URI 406B such as 5b5stu008, a type 408B such as core #person, a label 410B such as Harry@en_US, an aliases 412B such as HS, a description 414B such as Harry is a fictional character@en_US, and literal 416B such as Harry@en_US and Simons@en_US. In an embodiment, the icon may be a visual representation of the term, the type may be defined within an ontology used by the knowledge graph 110, the label may be considered as the main label while others may be considered as the aliases, the description may be a short multilingual description of the term, and the literals are properties of the term which are defined in the ontology for providing additional information of the terms. The analyzer module 106 may determine the multi-level relation between the two terms based on the abovementioned corresponding data. For example, the analyzer module 106 may determine a first relation 418 in which Playdium (school) 402 has a student named Harry 404, and a second relation 420 in which Harry 404 is a member (student) of Playdium 402. The multi-level relationship information between entities associated with keywords (terms) may be used to determine the entity type of each keyword (term) and to select one or more actionable items for each keyword.

Figure 5:
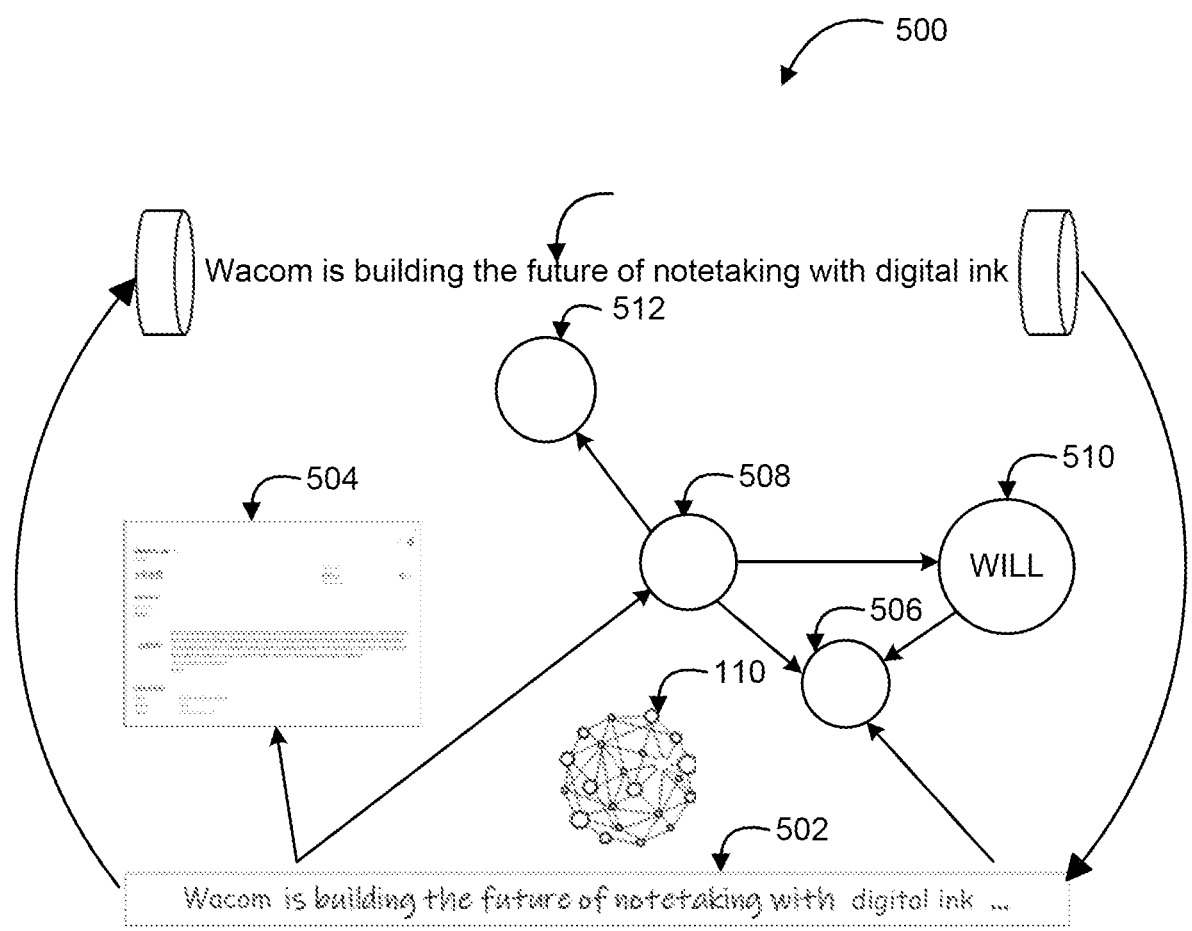
FIG. 5 illustrates an example implementation of the selectable quick actions rendering system using a knowledge graph, in accordance with an embodiment of the present disclosure.

FIG. 5 illustrates an example implementation 500 of the selectable quick actions rendering system 100 using a knowledge graph, in accordance with an embodiment of the present disclosure. In an embodiment of the present disclosure, the user may write 'Wacom is building the future of notetaking with digital Ink' in a handwritten document 206, as shown by 502. The selectable quick actions rendering system 100 may first recognize the handwritten text 208, as shown by 514 to identify 'wacom' and 'digital Ink' as keywords for providing one or more quick actions. Then, the selectable quick actions rendering system 100 may classify each of the identified one or more keywords 212 into an entity type. To classify each of the one or more keywords 212 into an entity type, the analyzer module 106 performs a first-level search for 'wacom' and 'digital Ink' in the knowledge graph 110, to identify first-level searching nodes 508 and 506, respectively. Thereafter, the selectable quick actions rendering system 100 may determine a multi-level relation through nodes 512 and 510, respectively. Based on such multi-level relation of the identified keywords, the analyzer module 106 may identify the entity type of the one or more keywords 212, such as 'a company' for 'Wacom' and 'a product' for 'digital ink'. Thereafter, the analyzer module 106 may determine a set of actionable items for the keywords to create one or more respective quick actions. In an exemplary embodiment, such one or more quick actions may be rendered on the handwritten document 206 in the form of a dynamic window, as shown by 504, to prompt the user to view more information about the keyword 'Wacom', for example.

FIGS. 6A-6H show exemplary outcomes of the selectable quick actions rendering system 100, in accordance with various embodiments of the present disclosure. For the sake of brevity, FIGS. 6A-6H will be explained together.

Figure 6A:
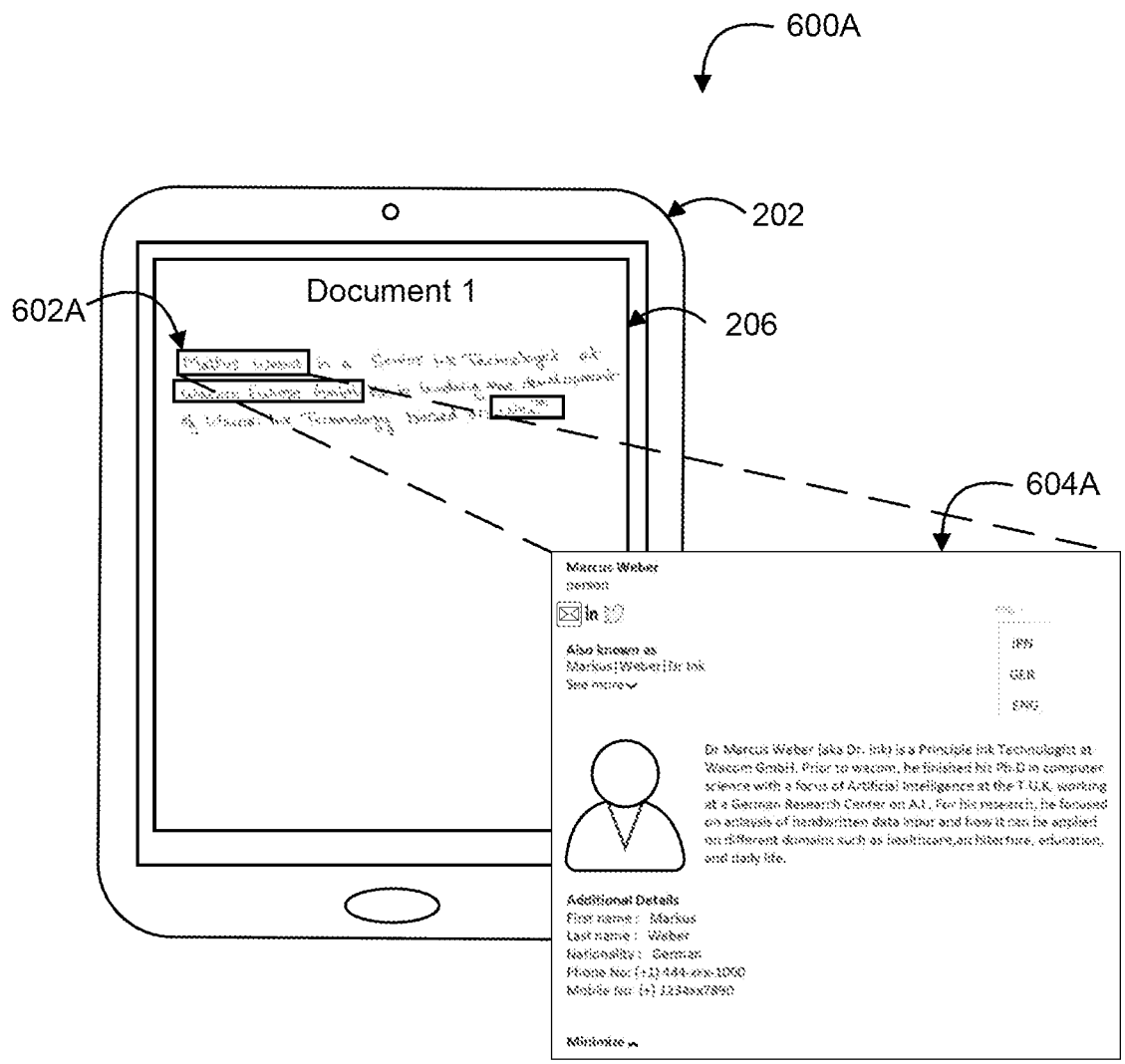
FIGS. 6A-6H show exemplary outcomes of the selectable quick actions rendering system, in accordance with various embodiments of the present disclosure.

In an implementation 600A of the present disclosure, as shown in FIG. 6A, the electronic device 202 may facilitate the user to generate the handwritten document 206 such as 'Document 1' with the handwritten text 208. Further, the selectable quick actions rendering system 100 may utilize one or more steps, as described above, to recognize the handwritten text 208 to identify one or more keywords such as 'Markus Weber' 602A and classify it into an entity type of a person. Based on the classified entity type, the selectable quick actions rendering system 100 determines a set of actionable items that should be rendered for the person to create one or more quick actions specific to 'Markus Weber' 602A. Further, the selectable quick actions rendering system 100 may highlight 'Markus Weber' 602A on the handwritten document 206, such that when the user clicks, then a dynamic window 604A pops up on the screen of the electronic device 202 that displays more information about 'Markus Weber' 602A based on the created one or more quick actions.

Figure 6B:
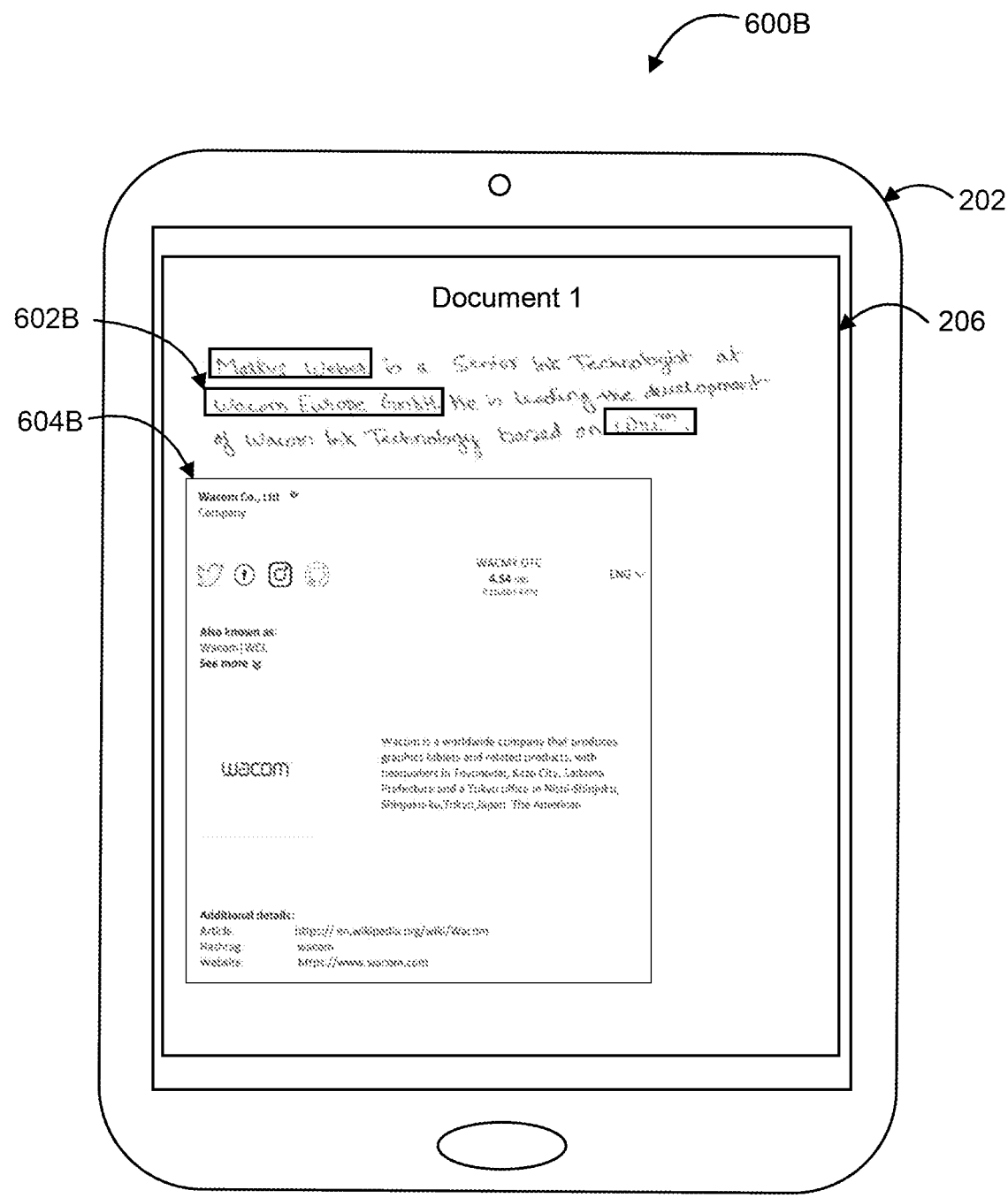

In another implementation 600B of the present disclosure, as shown in FIG. 6B, the selectable quick actions rendering system 100 may identify one or more keywords such as 'Wacom Europe GmbH' 602B, and classify it into an entity type of a company. Based on the classified entity type, the selectable quick actions rendering system 100 determines a set of actionable items that should be rendered for the company to create one or more quick actions specific to 'Wacom Europe GmbH' 602B. Further, the selectable quick actions rendering system 100 may highlight 'Wacom Europe GmbH' 602B on the handwritten document 206, such that when the user hovers over 'Wacom Europe GmbH' 602B for more than a threshold period of time, then a dynamic window 604B pops up on the screen of the electronic device 202 that displays more information about 'Wacom Europe GmbH' 602B based on the created one or more quick actions.

Figure 6C:
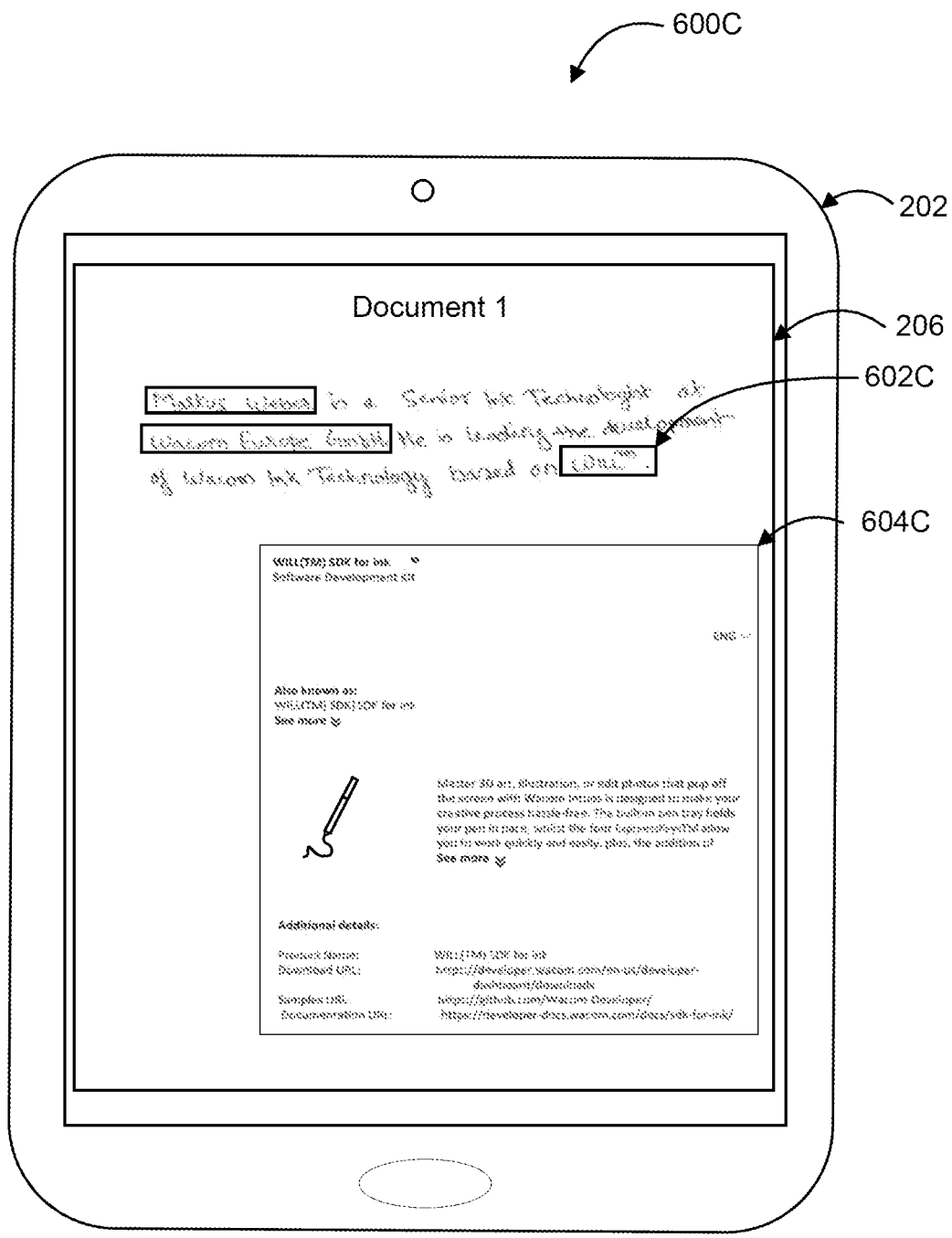

In yet another implementation 600C of the present disclosure, as shown in FIG. 6C, the selectable quick actions rendering system 100 may identify one or more keywords such as 'WILL' 602C, and classify it into an entity type of a product. Based on the classified entity type, the selectable quick actions rendering system 100 determines a set of actionable items that should be rendered for the product to create one or more quick actions specific to 'WILL' 602C. Further, the selectable quick actions rendering system 100 may highlight 'WILL' 602C on the handwritten document 206, such that when the user clicks or hovers on 'WILL' 602C for more than a threshold period of time, then a dynamic window 604C pops up on the screen of the electronic device 202 that displays more information about 'WILL' 602C based on the created one or more quick actions.

Figure 6D:
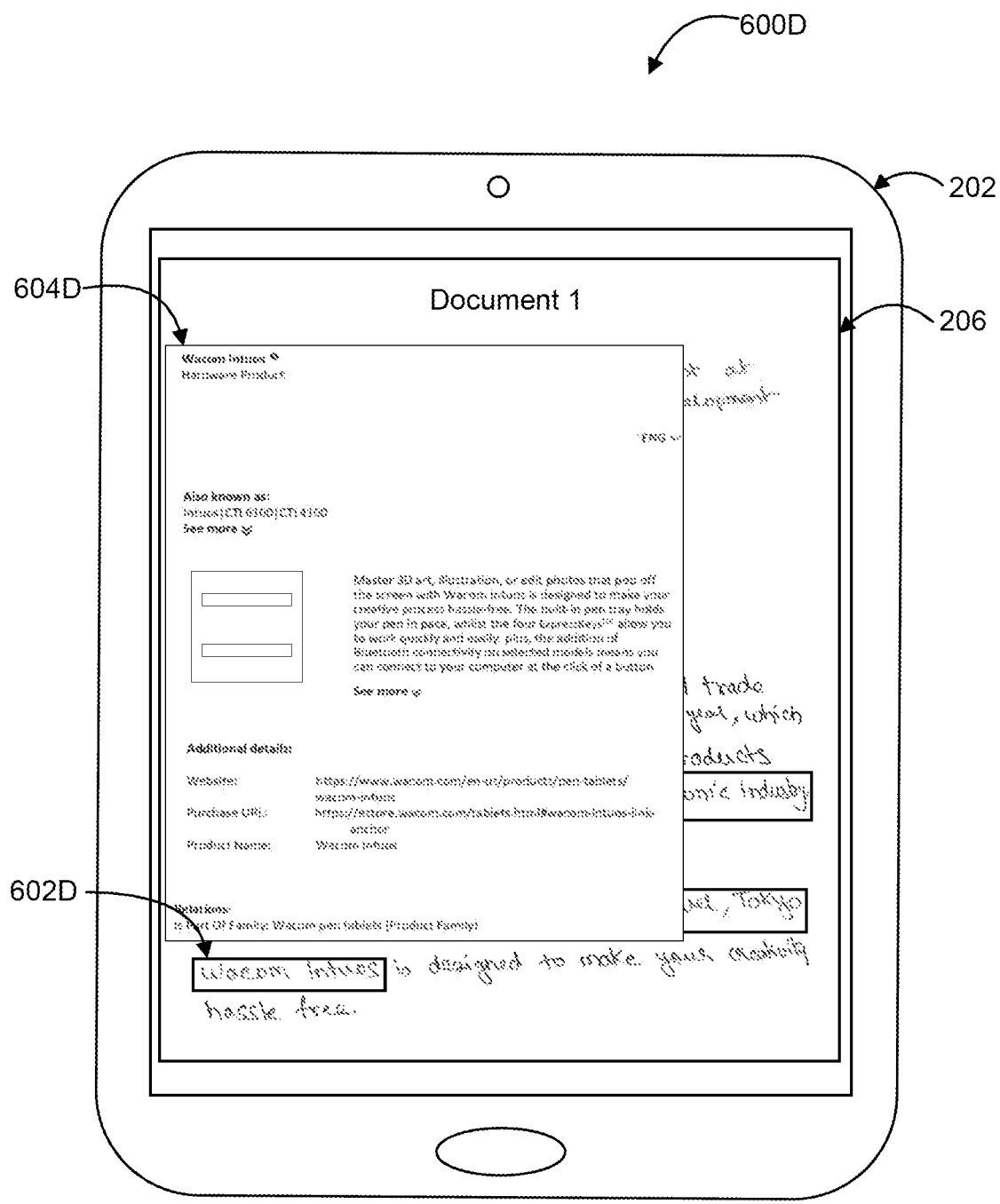

In yet another implementation 600D of the present disclosure, as shown in FIG. 6D, the selectable quick actions rendering system 100 may identify one or more keywords such as 'Wacom Intuos' 602D, and classify it into an entity type of a product. Based on the classified entity type, the selectable quick actions rendering system 100 determines a set of actionable items that should be rendered for the product to create one or more quick actions specific to 'Wacom Intuos' 602D. Further, the selectable quick actions rendering system 100 may highlight 'Wacom Intuos' 602D on the handwritten document 206, such that when the user clicks or hovers on 'Wacom Int' 602D for more than a threshold period of time, then a dynamic window 604D pops up on the screen of the electronic device 202 that displays more information about 'Wacom Intuos' 602D based on the created one or more quick actions.

Figure 6E:
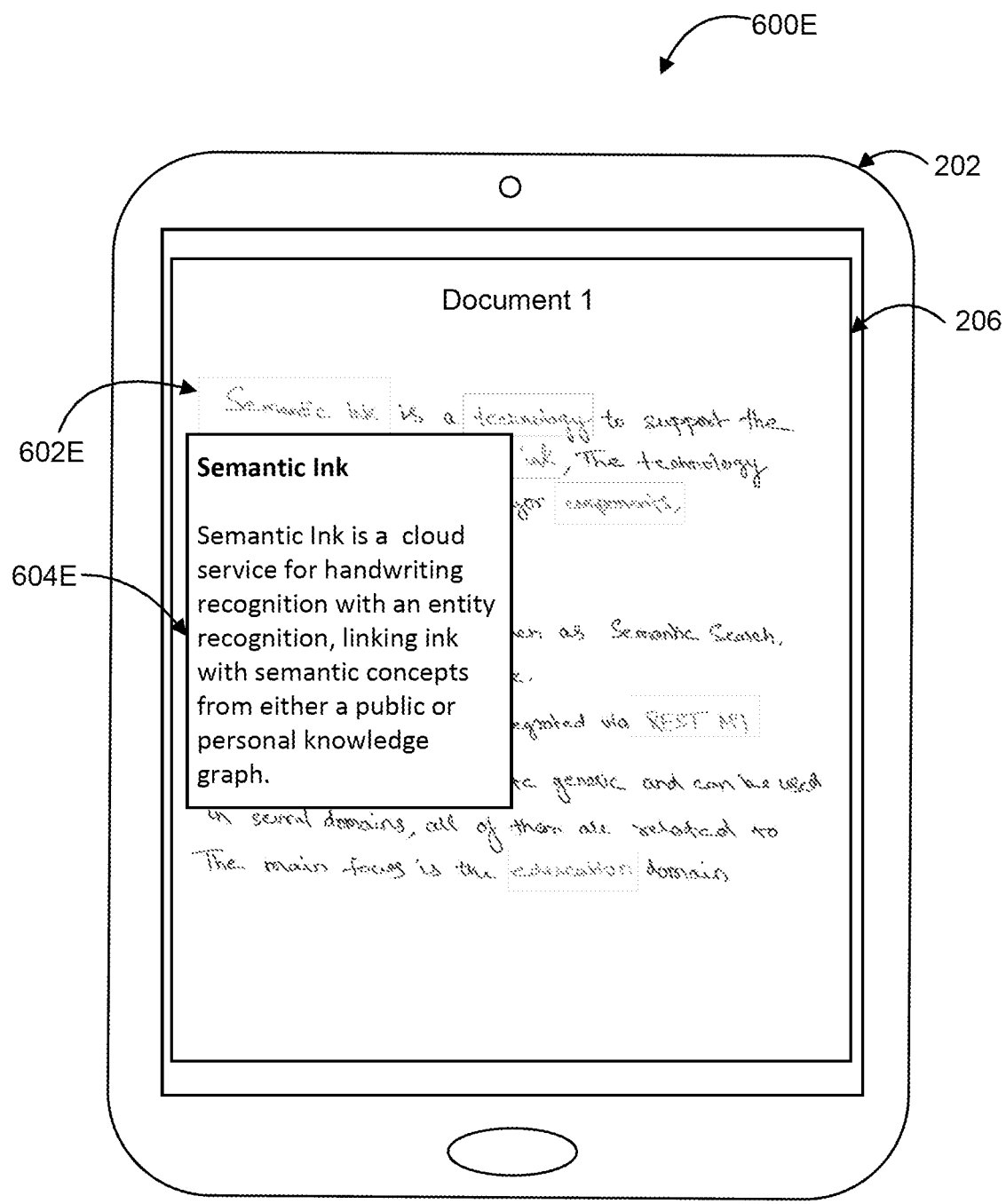

In yet another implementation 600E of the present disclosure, as shown in FIG. 6E, the selectable quick actions rendering system 100 may identify one or more keywords such as 'Semantic Ink' 602E, and classify it into an entity type of a technology. Based on the classified entity type, the selectable quick actions rendering system 100 determines a set of actionable items that should be rendered for the technology to create one or more quick actions specific to 'Semantic Ink' 602E. Further, the selectable quick actions rendering system 100 may highlight 'Semantic Ink' 602E on the handwritten document 206 and displays a small window 604E to render quick information about 'Semantic Ink' 602E extracted from one or more sources based on the created one or more quick actions.

Figure 6F:
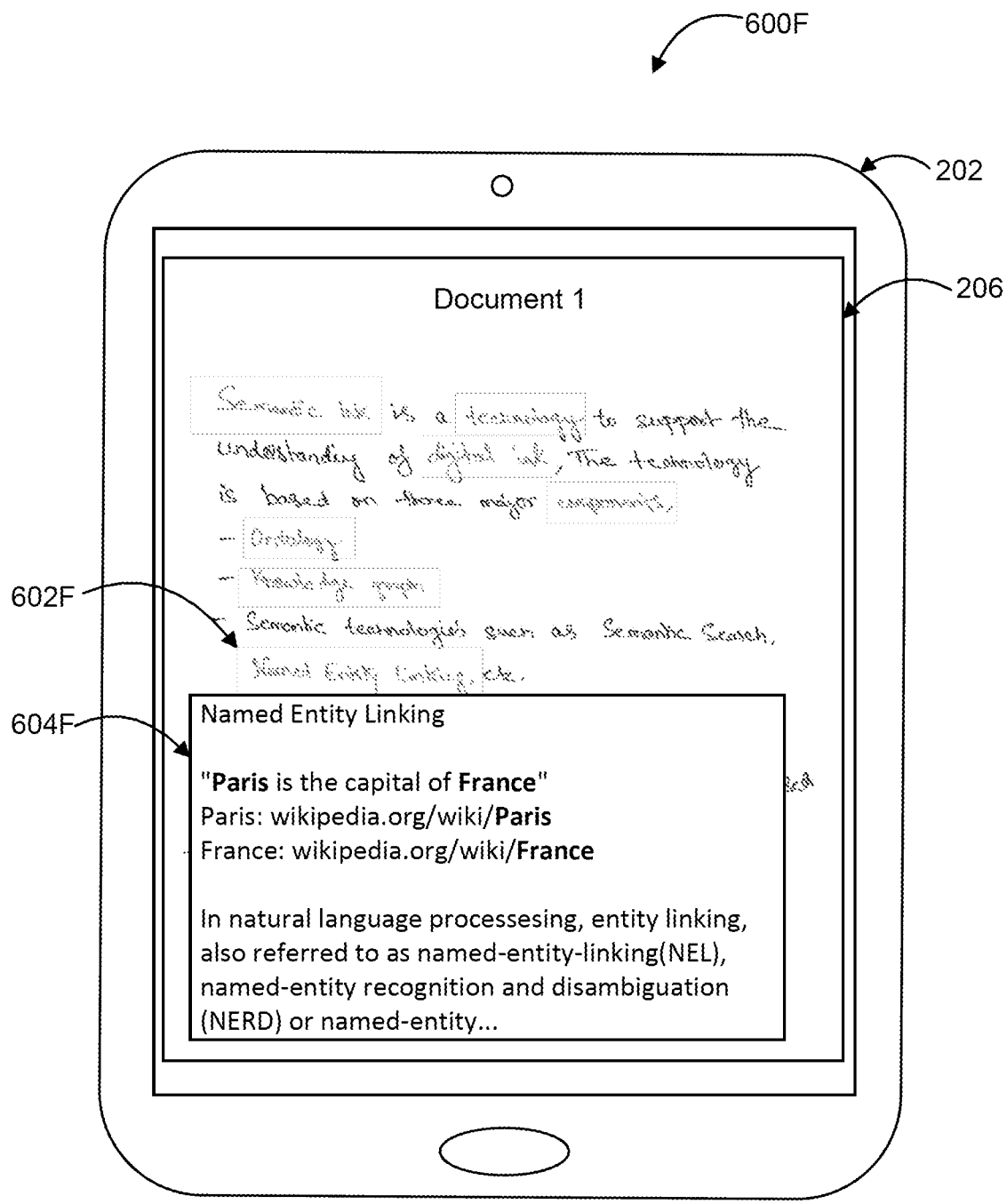

In yet another implementation 600F of the present disclosure, as shown in FIG. 6F, the selectable quick actions rendering system 100 may identify one or more keywords such as 'Named Entity Linking' 602F, and classify it into an entity type of a technology. Based on the classified entity type, the selectable quick actions rendering system 100 determines a set of actionable items that should be rendered for the technology to create one or more quick actions specific to 'Named Entity Linking' 602F. Further, the selectable quick actions rendering system 100 may highlight 'Named Entity Linking' 602F on the handwritten document 206 and displays a small window 604F to display detailed information about 'Named Entity Linking' 602F having one or more hyperlinks to allow the user to access one or more relevant documents to get more information about the 'Named Entity Linking' 602F.

Figure 6G:
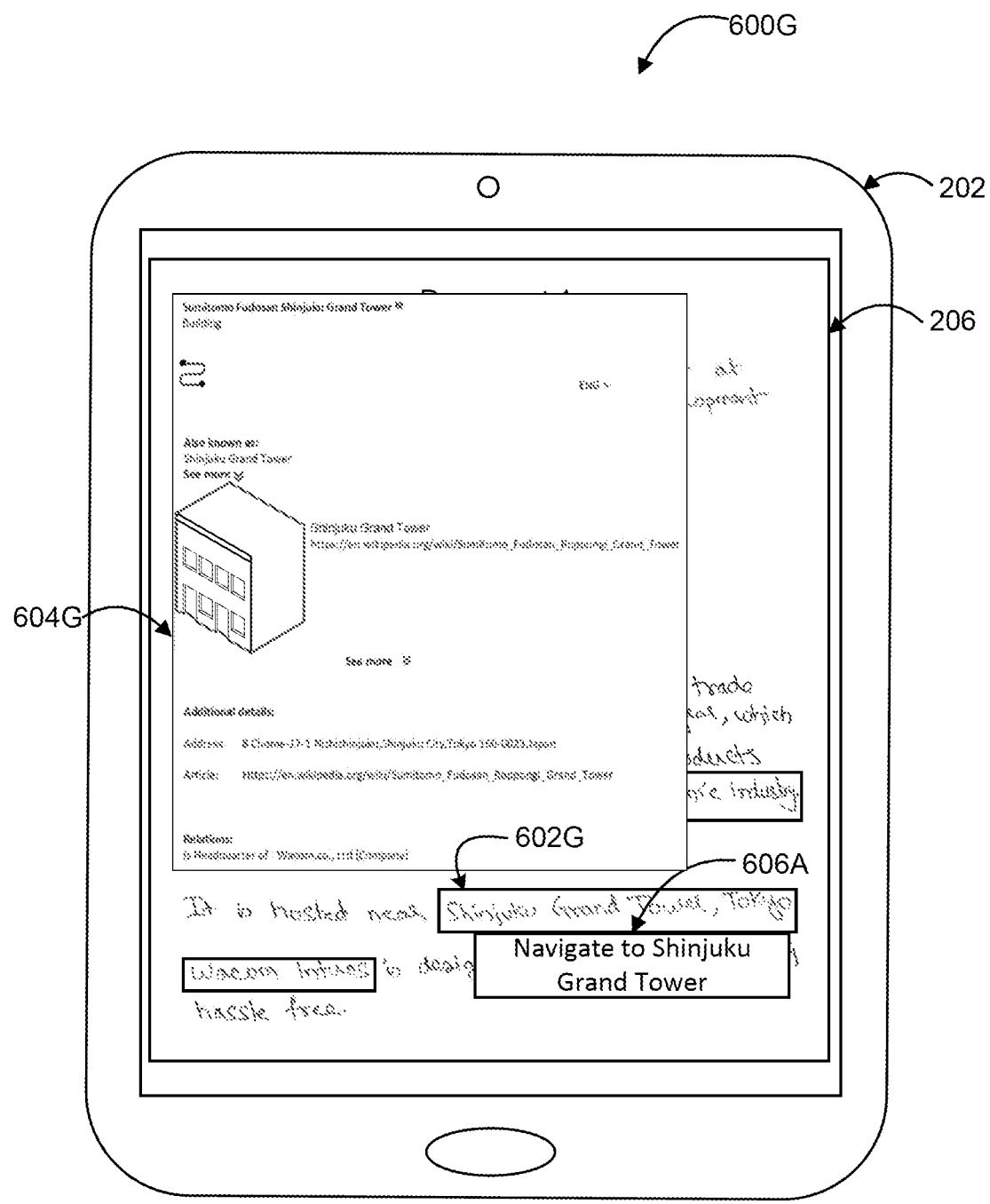

In yet another implementation 600G of the present disclosure, as shown in FIG. 6G, the selectable quick actions rendering system 100 may identify one or more keywords such as 'Shinjuku Grand Tower' 602G, and classify it into an entity type of a location. Based on the classified entity type, the selectable quick actions rendering system 100 determines a set of actionable items that should be rendered for the location to create one or more quick actions specific to 'Shinjuku Grand Tower' 602G. Further, the selectable quick actions rendering system 100 may highlight 'Shinjuku Grand Tower' 602G on the handwritten document 206 and displays a small window 604G to display detailed information about 'Shinjuku Grand Tower' 602G along with a selectable option to 'Navigate to Shinjuku Grand Tower' 606A. The user may click on the selectable option 'Navigate to Shinjuku Grand Tower' 606A to automatically open the map with navigation to the 'Shinjuku Grand Tower' 602G.

Figure 6H:
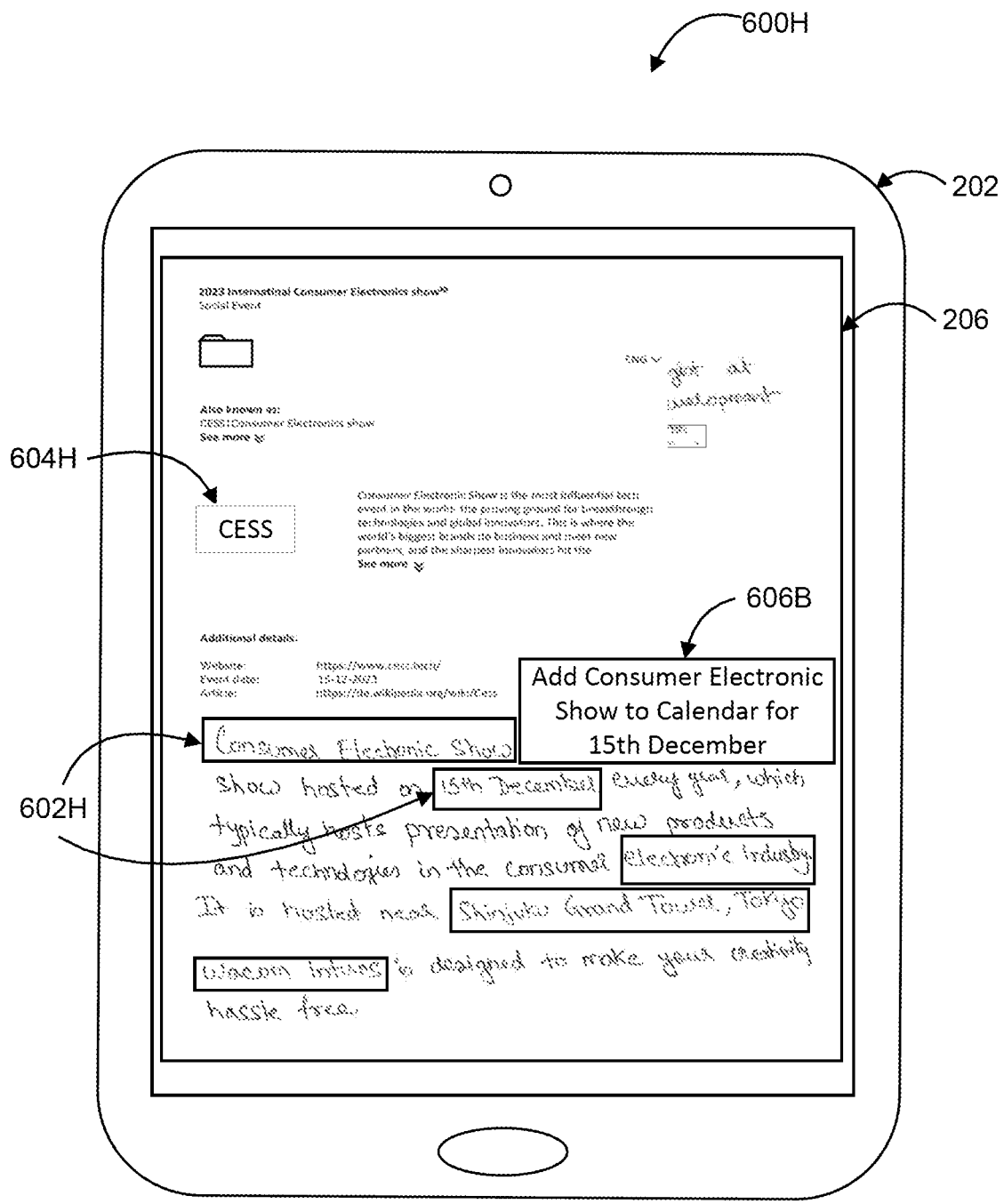

In yet another implementation 600H of the present disclosure, as shown in FIG. 6H, the selectable quick actions rendering system 100 may identify one or more keywords such as 'Consumer Electronic Show' and '15$^{th}$ December' 602H and classify them into an entity type of an event with a date. Based on the classified entity type, the selectable quick actions rendering system 100 determines a set of actionable items that should be rendered for the event to create one or more quick actions specific to 'Consumer Electronic Show' and '15$^{th}$ December' 602H. Further, the selectable quick actions rendering system 100 may highlight 'Consumer Electronic Show' along with '15$^{th}$ December' 602H on the handwritten document 206 and displays a small window 604H to display detailed information about 'Consumer Electronic Show' 602H along with a selectable option to 'Add consumer electronic show to calendar for 15$^{th}$ December' 606B. The user may click on the selectable option 'Add consumer electronic show to calendar for 15$^{th}$ December' 606B to automatically open the calendar to make an entry for the consumer electronic show on the 15$^{th}$ of December without performing a series of manual steps of opening the calendar, typing an event, entering a date, or the like.

Figure 7:
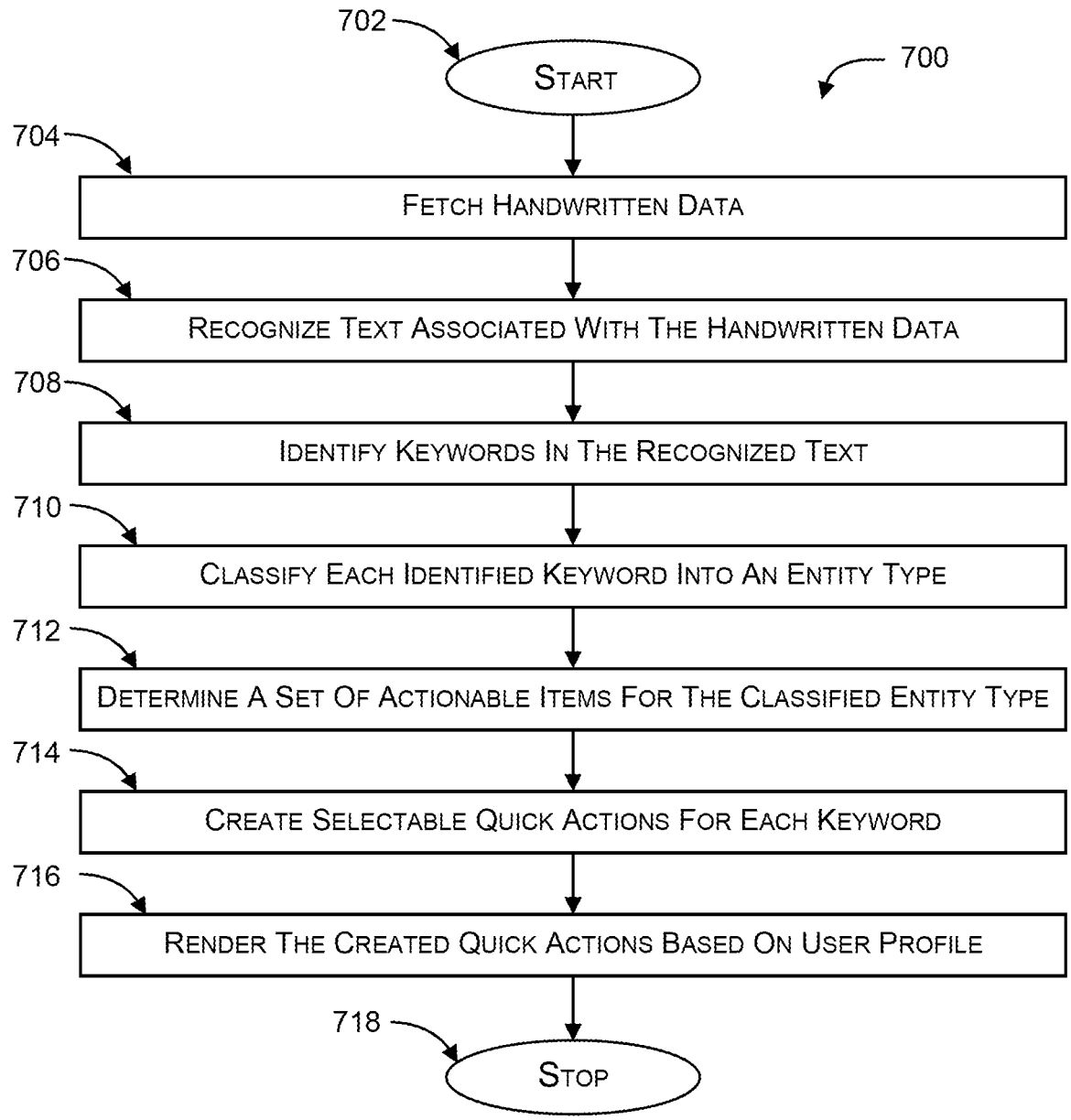
FIG. 7 illustrates a flowchart of a method for providing selectable quick actions on handwritten data in a handwritten document, in accordance with an embodiment of the present disclosure.

FIG. 7 illustrates a flowchart 700 of a method of providing selectable quick actions on handwritten data in a handwritten document, in accordance with an embodiment of the present disclosure. The method starts at step 702.

At first, handwritten data may be fetched, at step 704. The handwritten data may correspond to strokes made by a user in the handwritten document on a screen of an electronic device. Next, text associated with the handwritten data may be recognized, at step 706. The text may be recognized by employing a handwriting recognition technique.

Next, one or more keywords in the identified text may be identified, at step 708. In an embodiment of the present disclosure, the one or more keywords may be identified by employing predictive learning based on the profile associated with the user. Once the one or more keywords are identified, the associated one or more quick actions are identified which must be rendered for the user. In such a scenario, the profile associated with the user may have historical data of the user indicative of the keywords of interest to the user, the keywords that the user should know about, the keywords that the user knows about, the keywords that are appropriate for the user, and/or the keywords that are inappropriate for the user. In another embodiment of the present disclosure, the one or more keywords may be identified by employing predictive learning based on the profile associated with the user to identify the determined one or more quick actions of interest to the user. In such a scenario, the profile associated with the user may include user interests, user's profession, user's schedule, and/or user's list of events.

Next, each of the identified one or more keywords may be classified into an entity type from one or more entity types, at step 710. The one or more keywords may be classified into the entity type by employing a named entity recognition, a named entity linking, a knowledge graph, or a combination thereof. The one or more entity types may include a person, a company, a legal entity, a location, an abstract concept, a service, a product, or a combination thereof.

Next, a set of actionable items associated with the classified entity type corresponding to each keyword may be determined, at step 712. The set of actionable items may include show relation information, show social media, show description, show alternate names, show mail, show planner, show weather checker, show accommodation booking options, show options to add event to a calendar, show summarized relevant information, show digital wallet options, show read more, show direct call options, show RSVP option, show enable/disable options, show purchase options, or a combination thereof.

Next, one or more quick actions, selectable by the user, for each keyword may be created, at step 714, based on the determined set of actionable items via the knowledge graph. The one or more quick actions may include providing, for each keyword, relation information of persons, relation information of the company, one-touch social media links, description information, alternate names, mail shortcut, planner, weather checker, accommodation booking options, an option to add the event to a calendar, summarized relevant information along with one or more link, read more link, calling options, message sending option for RSVP, shortcuts for enable/disable the service, a link for purchasing a product, or a combination thereof.

Next, the created one or more quick actions associated with each keyword on the handwritten document may be rendered, at step 716, based on a profile associated with the user. The one or more quick actions may be rendered in the form of a list of all the quick actions for each keyword on the handwritten document, adding emphases to the one or more keywords for rendering the corresponding quick actions, and/or presenting the one or more quick actions in a dynamic window overlaying the one or more keywords in the digital document. Such dynamic window for a specific keyword may be generated when a predicted user action score for a specific quick action is more than a threshold value. Further, the dynamic window may pop up based on an action such as clicking on the keyword and hovering on the keyword for more than a threshold period of time. The method may end at step 718.

Figure 8:
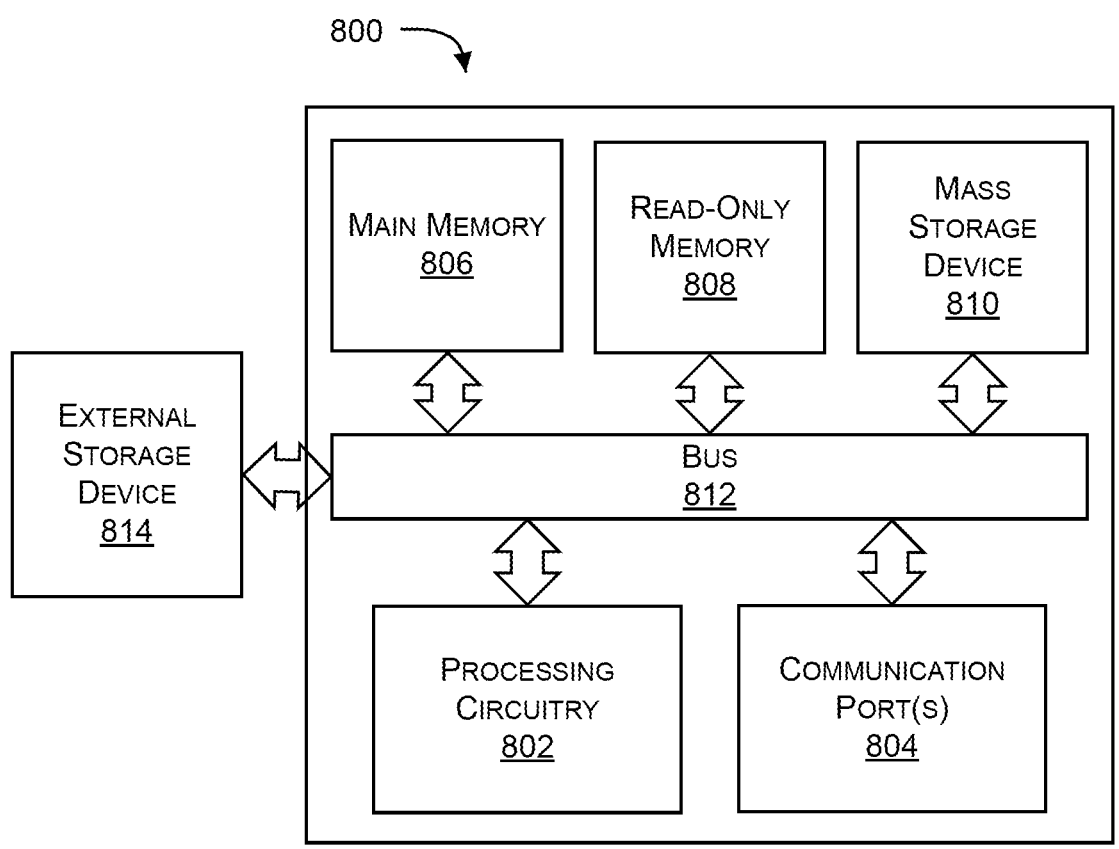
FIG. 8 illustrates an exemplary computer system in which or with which an embodiment of the present disclosure may be utilized.

FIG. 8 illustrates an exemplary computer system in which or with which embodiments of the present disclosure may be utilized. As shown in FIG. 8, a computer system 800 includes an external storage device 802, a bus 804, a main memory 806, a read-only memory 808, a mass storage device 810, a communication port 812, and a processor 814.

Those skilled in the art will appreciate that the computer system 800 may include more than one processor 814 and communication ports 812. Examples of processor 814 include, but are not limited to, an Intel® Itanium® or Itanium 2 processor(s), or AMD® Opteron® or Athlon MP® processor(s), Motorola® lines of processors, Forti-SOC™ system on chip processors or other future processors. Processor 814 may include various modules associated with embodiments of the present disclosure.

Communication port 812 can be any of an RS-232 port for use with a modem-based dialup connection, a 10/100 Ethernet port, a Gigabit or 10 Gigabit port using copper or fiber, a serial port, a parallel port, or other existing or future ports. Communication port 812 may be chosen depending on a network, such as a Local Area Network (LAN), Wide Area Network (WAN), or any network to which the computer system connects.

Memory 806 can be Random Access Memory (RAM), or any other dynamic storage device commonly known in the art. Read-Only Memory 808 can be any static storage device(s), e.g., but not limited to, a Programmable Read-Only Memory (PROM) chips for storing static information, e.g., start-up or BIOS instructions for processor 814.

Mass storage 810 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g., those available from Seagate (e.g., the Seagate Barracuda 7200 family) or Hitachi (e.g., the Hitachi Deskstar 7K1000), one or more optical discs, Redundant Array of Independent Disks (RAID) storage, e.g., an array of disks (e.g., SATA arrays), available from various vendors including Dot Hill Systems Corp., LaCie, Nexsan Technologies, Inc. and Enhance Technology, Inc.

Bus 804 communicatively couples processor(s) 814 with the other memory, storage, and communication blocks. Bus 804 can be, e.g., a Peripheral Component Interconnect (PCI)/PCI Extended (PCI-X) bus, Small Computer System Interface (SCSI), USB, or the like, for connecting expansion cards, drives, and other subsystems as well as other buses, such a front side bus (FSB), which connects processor 814 to a software system.

Optionally, operator and administrative interfaces, e.g., a display, keyboard, and a cursor control device, may also be coupled to bus 804 to support direct operator interaction with the computer system. Other operator and administrative interfaces can be provided through network connections connected through communication port 812. An external storage device 802 can be any kind of external hard-drives, floppy drives, IOMEGA® Zip Drives, Compact Disc-Read-Only Memory (CD-ROM), Compact Disc-Re-Writable (CD-RW), Digital Video Disk-Read Only Memory (DVD-ROM). The components described above are meant only to exemplify various possibilities. In no way should the aforementioned exemplary computer system limit the scope of the present disclosure.

While embodiments of the present disclosure have been illustrated and described, it will be clear that the disclosure is not limited to these embodiments only. Numerous modifications, changes, variations, substitutions, and equivalents will be apparent to those skilled in the art, without departing from the scope of the disclosure.

Thus, it will be appreciated by those of ordinary skill in the art that the diagrams, schematics, illustrations, and the like represent conceptual views or processes illustrating systems and methods embodying this disclosure. The functions of the various elements shown in the FIGURES may be provided through the use of dedicated hardware as well as hardware capable of executing associated software. Similarly, any switches shown in the FIGURES are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular name.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices can exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

While the foregoing describes various embodiments of the disclosure, other and further embodiments of the disclosure may be devised without departing from the basic scope thereof. The scope of the disclosure is determined by the claims that follow. The disclosure is not limited to the described embodiments, versions, or examples, which are included to enable a person having ordinary skill in the art to make and use the disclosure when combined with information and knowledge available to the person having ordinary skill in the art.

The invention claimed is:

1. A system for providing selectable quick actions on handwritten data in a handwritten document, the system comprising:
   a receiver module configured to fetch the handwritten data corresponding to strokes made by a user in the handwritten document on a screen of an electronic device;
   a recognition module configured to:
      recognize text associated with the received handwritten data by employing a handwriting recognition technique;
      identify one or more keywords in the recognized text;
   an analyzer module configured to:
      classify each of the identified one or more keywords into an entity type from one or more entity types by employing: a named entity recognition, a named entity linking, and a knowledge graph;
      determine a set of actionable items associated with the classified entity type corresponding to each keyword, wherein the set includes at least one actionable item;
      create one or more quick actions, selectable by the user, for each keyword based on the determined set of actionable items via the knowledge graph; and
   a rendering module configured to render the created one or more quick actions associated with each keyword on the handwritten document based on a profile associated with the user, wherein the rendering includes at least one of:
   employing a predictive leaning based on the profile to identify a keyword of interest to the user, the profile including historical data of the user indicative of keywords of interest to the user; and displaying the one or more quick actions associated with the identified keyword on the handwritten document while visually emphasizing the identified keyword; or
   employing a predictive learning based on the profile to identify a quick action of interest to the user, the profile including at least one of the user's interest, the user's profession, the user's schedule, or the user's events; and displaying the identified quick action on the handwritten document.

2. The system as claimed in claim 1, wherein the electronic device corresponds to at least one of: a touch-enabled device, a stylus-enabled device, and a pen-enabled device, including at least one of: a mobile phone, a tablet, a personal computer, a digital signage, a smartboard, and a television.

3. The system as claimed in claim 1, wherein the handwritten data is received in form of one or more tuples having at least one of: data on x-axis, data on y-axis, pressure, speed of writing, and orientation.

4. The system as claimed in claim 3, wherein the handwriting recognition techniques analyze each of the received one or more tuples to identify the closest recognized term that each of the received one or more tuples potentially represents.

5. The system as claimed in claim 1, wherein the recognition module removes unnecessary data from the recognized text to identify the one or more keywords, the unnecessary data includes at least one of: stop words, punctuation marks, and spaces.

6. The system as claimed in claim 1, wherein the one or more entity types include at least one of: a person, a company, a legal entity, a location, an event, an abstract concept, a service, and a product.

7. The system as claimed in claim 1, wherein the set of actionable items includes at least one of: show relation information, show social media, show description, show alternate names, show mail, show planner, show weather checker, show accommodation booking options, show option to add an event to a calendar, show summarized relevant information, show digital wallet options, show read more, show direct call options, show RSVP option, show enable/disable options, and show purchase option.

8. The system as claimed in claim 7, wherein the one or more quick actions include providing, for each keyword, at least one of: relation information of persons, relation information of the company, one-touch social media links, description information, alternate names, mail shortcut, planner, weather checker, accommodation booking options, an option to add the event to a calendar, summarized relevant information along with one or more link, read more link, calling options, message sending option for RSVP, shortcuts for enable/disable the service, and link for purchasing a product.

9. The system as claimed in claim 1, wherein the rendering module renders the one or more quick actions in form of at least one of: a list of all the quick actions for each keyword on the handwritten document, adding emphases to the one or more keywords to render the corresponding quick actions, and presenting the one or more quick actions in a dynamic window overlaying the one or more keywords in the handwritten document.

10. The system as claimed in claim 9, wherein the dynamic window for a specific keyword is generated when a predicted user action score for a specific quick action is more than a threshold value,
wherein the dynamic window pop-ups based on an action including at least one of: clicking on the keyword and hovering on the keyword for more than a threshold period of time.

11. The system as claimed in claim 1, wherein the historical data of the user is indicative of the keywords that are inappropriate for the user.

12. A method for providing selectable quick actions on handwritten data in a handwritten document, the method comprising:
fetching the handwritten data corresponding to strokes made by a user in the handwritten document on a screen of an electronic device;
recognizing text associated with the received handwritten data by employing a handwriting recognition technique;
identifying one or more keywords in the recognized text;
classifying each of the identified one or more keywords into an entity type from one or more entity types by employing: a named entity recognition, a named entity linking, and a knowledge graph;
determining a set of actionable items associated with the classified entity type corresponding to each keyword, wherein the set includes at least one actionable item;
creating one or more quick actions, selectable by the user, for each keyword based on the determined set of actionable items via the knowledge graph; and
rendering the created one or more quick actions associated with each keyword on the handwritten document based on a profile associated with the user, wherein the rendering includes at least one of:
employing a predictive leaning based on the profile to identify a keyword of interest to the user, the profile including historical data of the user indicative of keywords of interest to the user; and displaying the one or more quick actions associated with the identified keyword on the handwritten document while visually emphasizing the identified keyword; or
employing a predictive learning based on the profile to identify a quick action of interest to the user, the profile including at least one of the user's interest, the user's profession, the user's schedule, or the user's events; and
displaying the identified quick action on the handwritten document.

13. The method as claimed in claim 12, wherein the one or more entity types include at least one of: a person, a company, a legal entity, a location, an event, an abstract concept, a service, and a product.

14. The method as claimed in claim 12, wherein the set of actionable items includes at least one of: show relation information, show social media, show description, show alternate names, show mail, show planner, show weather checker, show accommodation booking options, show option to add the event to a calendar, show summarized relevant information, show digital wallet options, show read more, show direct call options, show RSVP option, show enable/disable options, and show purchase option.

15. The method as claimed in claim 14, wherein the one or more quick actions include providing, for each keyword, at least one of: relation information of persons, relation information of the company, one-touch social media links, description information, alternate names, mail shortcut, planner, weather checker, accommodation booking options, an option to add the event to a calendar, summarized relevant information along with one or more link, read more link, calling options, message sending option for RSVP, shortcuts for enable/disable the service, and link for purchasing a product.

16. The method as claimed in claim 12, further comprising rendering the one or more quick actions in form of at least one of: a list of all the quick actions for each keyword on the handwritten document, adding emphases to the one or more keywords to render the corresponding quick actions, and presenting the one or more quick actions in a dynamic window overlaying the one or more keywords in the handwritten document.

17. The method as claimed in claim 16, wherein the dynamic window for a specific keyword is generated when a predicted user action score for a specific quick action is more than a threshold value,
wherein the dynamic window pop-ups based on an action including at least one of: clicking on the keyword and hovering on the keyword for more than a threshold period of time.

18. The method as claimed in claim 12, wherein the historical data of the user is indicative of the keywords that are inappropriate for the user.

* * * * *